US012585433B2

(12) United States Patent
Lin

(10) Patent No.: US 12,585,433 B2
(45) Date of Patent: Mar. 24, 2026

(54) DEVICE AND METHOD OF HANDLING A MODULAR MULTIPLICATION

(71) Applicant: PUFsecurity Corporation, Hsinchu County (TW)

(72) Inventor: Wen-Ching Lin, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 995 days.

(21) Appl. No.: 17/389,362

(22) Filed: Jul. 30, 2021

(65) Prior Publication Data

US 2022/0121424 A1 Apr. 21, 2022

Related U.S. Application Data

(60) Provisional application No. 63/094,355, filed on Oct. 21, 2020.

(51) Int. Cl.
G06F 7/72 (2006.01)
G06F 7/544 (2006.01)

(52) U.S. Cl.
CPC ............ G06F 7/722 (2013.01); G06F 7/5443 (2013.01); G06F 7/728 (2013.01)

(58) Field of Classification Search
CPC .......... G06F 7/722; G06F 7/728; G06F 7/523; G06F 7/5443; G06F 7/72–729; G06F 2207/72
See application file for complete search history.

(56) References Cited

U.S. PATENT DOCUMENTS

| | | | |
|---|---|---|---|
| 7,174,015 B1 | 2/2007 | Koç | |
| 10,101,969 B1 * | 10/2018 | Ruan | ...................... G06F 7/722 |
| 2002/0013799 A1 | 1/2002 | Blaker | |

(Continued)

FOREIGN PATENT DOCUMENTS

| | | |
|---|---|---|
| CN | 1489726 A | 4/2004 |
| CN | 102360276 A | 2/2012 |

(Continued)

OTHER PUBLICATIONS

Hennessy, John L., et al. Computer Architecture : A Quantitative Approach, Elsevier Science & Technology, 2014. ProQuest Ebook Central,http://ebookcentral.proquest.com/lib/uspto-ebooks/detail. action?docID=404052. (Year: 2014).*

*Primary Examiner* — Andrew Caldwell
*Assistant Examiner* — Huy Duong
(74) *Attorney, Agent, or Firm* — Winston Hsu

(57) ABSTRACT

A modular operation device for handling a modular multiplication, comprises a controller, configured to divide a multiplicand into a plurality of multiplicand words, a multiplier into a plurality of multiplier words, and a modulus into a plurality of modulus words; a first plurality of processing elements, coupled to the controller, configured to compute a first plurality of updated carry results and a first plurality of updated sum results; a second plurality of processing elements, coupled to the controller, configured to compute a second plurality of updated carry results and a second plurality of updated sum results; and a reduction element, coupled to the controller, configured to compute a resulting remainder according to the second plurality of updated carry results and the second plurality of updated sum results.

6 Claims, 17 Drawing Sheets

(56) References Cited

U.S. PATENT DOCUMENTS

| | | | | |
|---|---|---|---|---|
| 2005/0149595 A1* | 7/2005 | Fischer | ................... | G06F 7/722 |
| | | | | 708/492 |
| 2005/0198093 A1 | 9/2005 | Son | | |
| 2009/0100120 A1 | 4/2009 | Gokay | | |
| 2010/0023571 A1* | 1/2010 | Furukawa | ............... | G06F 7/728 |
| | | | | 708/491 |
| 2012/0197956 A1 | 8/2012 | Fischer | | |
| 2023/0185537 A1* | 6/2023 | Zhang | .................... | G06F 7/728 |
| | | | | 708/491 |

FOREIGN PATENT DOCUMENTS

| | | |
|---|---|---|
| CN | 106339204 A | 1/2017 |
| CN | 108415882 A | 8/2018 |
| DE | 101 42 155 C1 | 5/2002 |
| TW | 200400442 | 1/2004 |
| TW | 200403584 | 3/2004 |
| TW | 200416564 | 9/2004 |
| TW | 200504583 | 2/2005 |

* cited by examiner

30

| Outer iteration | Inner iteration | PE₀ | ... | PE_{k-1} |
|---|---|---|---|---|
| 1 | 1 | $PW_0 \times q_0 + 0 + Ms_0$ | ... | $AW_{K-1} \times BW_0 + Sc_{K-1} + Ss_K$ |
| | ... | ... | ... | ... |
| | f | $AW_{f-K} \times BW_0 + Sc_{f-K} + Ss_{f-K+1}$ | ... | $AW_{f-1} \times BW_0 + Sc_{f-1} + 0$ |
| | 1 | $PW_0 \times q_0 + Mc_0 + Ms_0$ | ... | $PW_{K-1} \times q_0 + Mc_{K-2} + Ms_{K-1}$ |
| | ... | ... | ... | ... |
| | f | $PW_{f-K} \times q_0 + Mc_{f-K-1} + Ms_{f-K}$ | ... | $PW_{f-1} \times q_0 + Mc_{f-2} + Ms_{f-1}$ |
| ... | ... | ... | ... | ... |
| e+1 | 1 | $PW_0 \times q_e + 0 + Ms_0$ | ... | $AW_{K-1} \times BW_e + Sc_{K-1} + Ss_K$ |
| | ... | ... | ... | ... |
| | f | $AW_{f-K} \times BW_e + Sc_{f-K} + Ss_{f-K+1}$ | ... | $AW_{f-1} \times BW_e + Sc_{f-1} + 0$ |
| | 1 | $PW_0 \times q_e + Mc_0 + Ms_0$ | ... | $PW_{K-1} \times q_e + Mc_{K-2} + Ms_{K-1}$ |
| | ... | ... | ... | ... |
| | f | $PW_{f-K} \times q_e + Mc_{f-K-1} + Ms_{f-K}$ | ... | $PW_{f-1} \times q_e + Mc_{f-2} + Ms_{f-1}$ |

FIG. 3

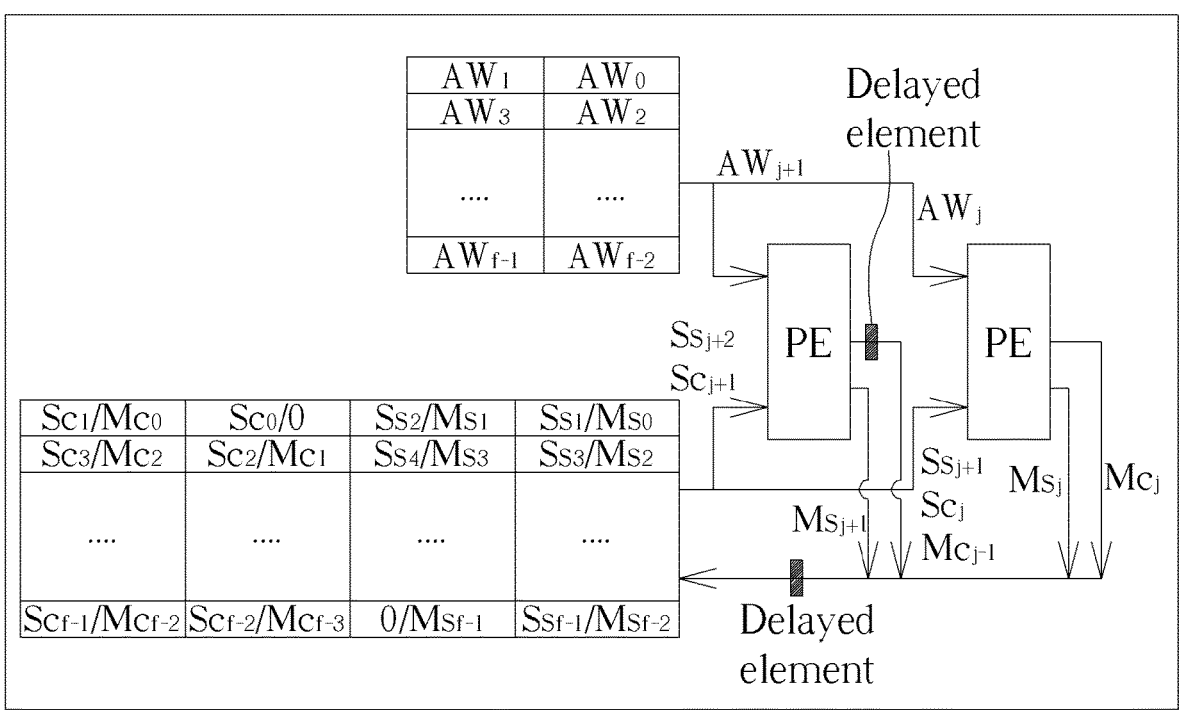
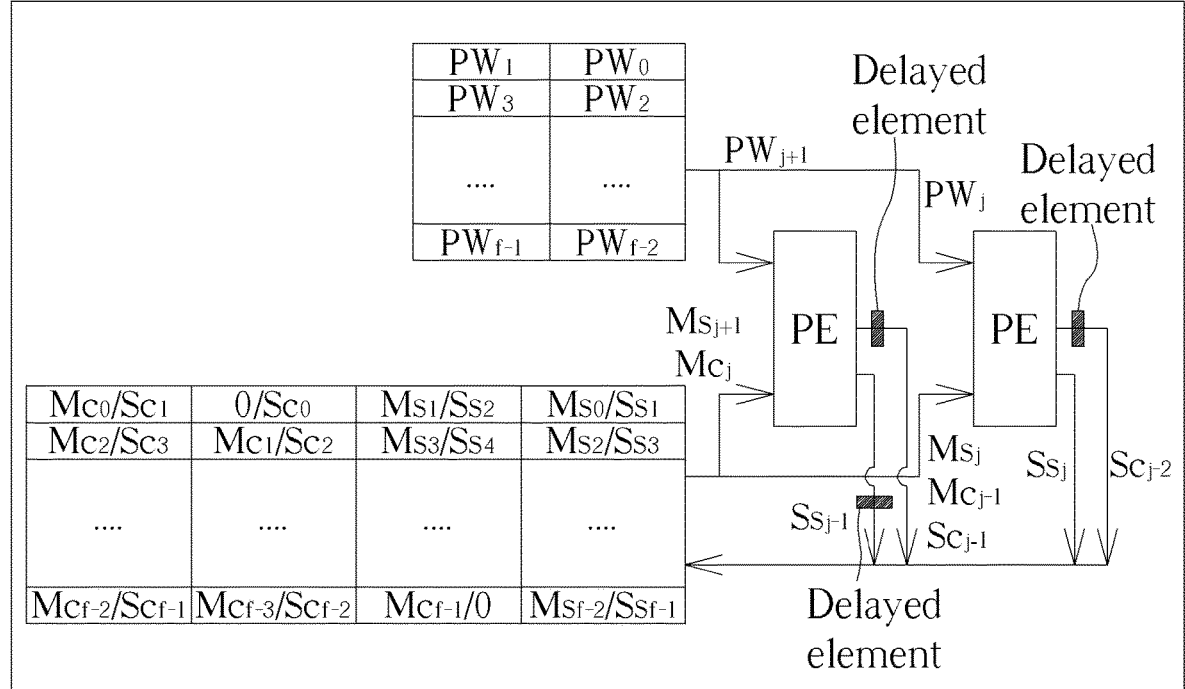
FIG. 4

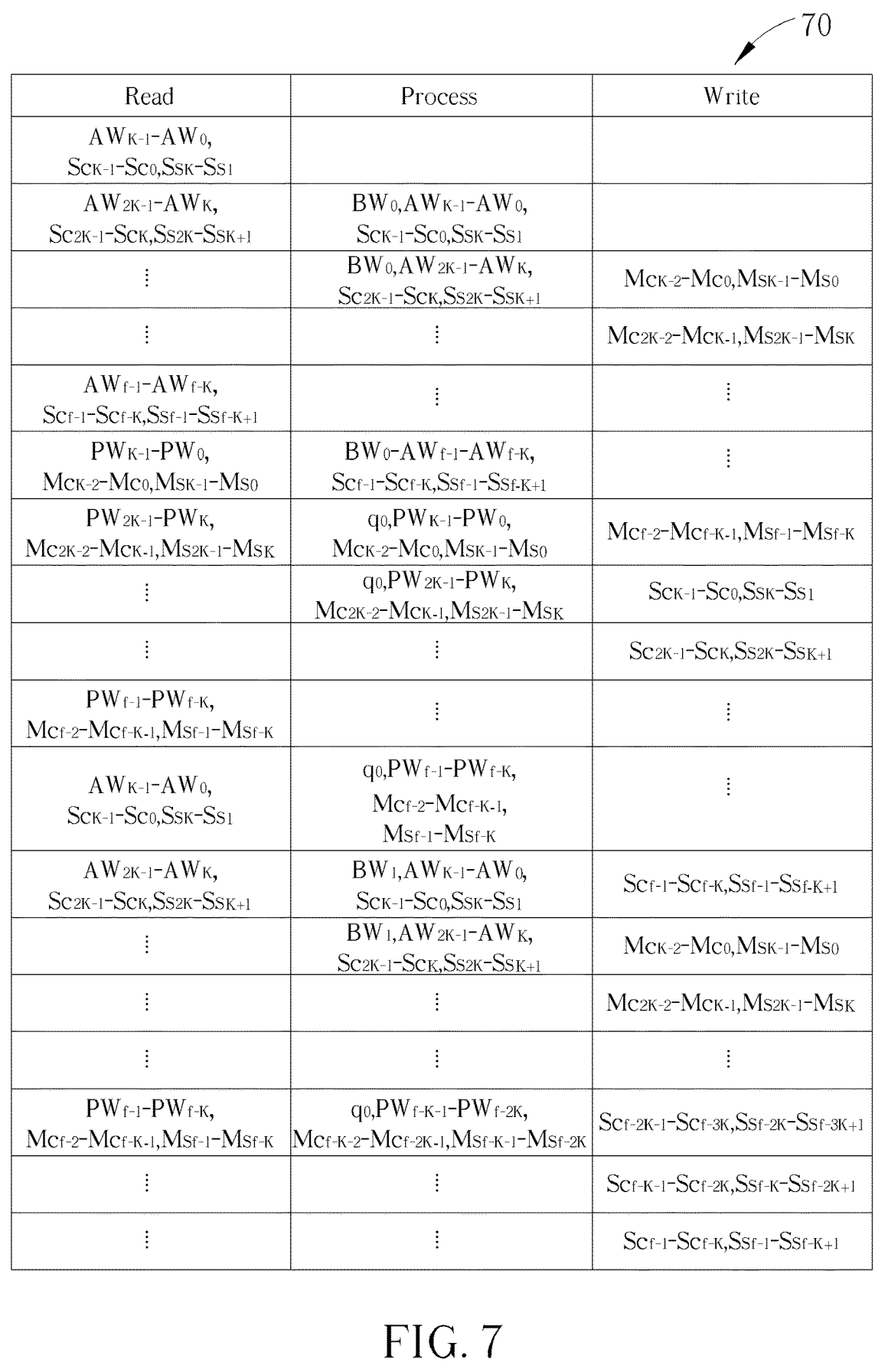

70

| Read | Process | Write |
|---|---|---|
| $AW_{K-1}$-$AW_0$, $Sc_{K-1}$-$Sc_0$,$Ss_K$-$Ss_1$ | | |
| $AW_{2K-1}$-$AW_K$, $Sc_{2K-1}$-$Sc_K$,$Ss_{2K}$-$Ss_{K+1}$ | $BW_0$,$AW_{K-1}$-$AW_0$, $Sc_{K-1}$-$Sc_0$,$Ss_K$-$Ss_1$ | |
| ⋮ | $BW_0$,$AW_{2K-1}$-$AW_K$, $Sc_{2K-1}$-$Sc_K$,$Ss_{2K}$-$Ss_{K+1}$ | $Mc_{K-2}$-$Mc_0$,$Ms_{K-1}$-$Ms_0$ |
| ⋮ | ⋮ | $Mc_{2K-2}$-$Mc_{K-1}$,$Ms_{2K-1}$-$Ms_K$ |
| $AW_{f-1}$-$AW_{f-K}$, $Sc_{f-1}$-$Sc_{f-K}$,$Ss_{f-1}$-$Ss_{f-K+1}$ | ⋮ | ⋮ |
| $PW_{K-1}$-$PW_0$, $Mc_{K-2}$-$Mc_0$,$Ms_{K-1}$-$Ms_0$ | $BW_0$-$AW_{f-1}$-$AW_{f-K}$, $Sc_{f-1}$-$Sc_{f-K}$,$Ss_{f-1}$-$Ss_{f-K+1}$ | ⋮ |
| $PW_{2K-1}$-$PW_K$, $Mc_{2K-2}$-$Mc_{K-1}$,$Ms_{2K-1}$-$Ms_K$ | $q_0$,$PW_{K-1}$-$PW_0$, $Mc_{K-2}$-$Mc_0$,$Ms_{K-1}$-$Ms_0$ | $Mc_{f-2}$-$Mc_{f-K-1}$,$Ms_{f-1}$-$Ms_{f-K}$ |
| ⋮ | $q_0$,$PW_{2K-1}$-$PW_K$, $Mc_{2K-2}$-$Mc_{K-1}$,$Ms_{2K-1}$-$Ms_K$ | $Sc_{K-1}$-$Sc_0$,$Ss_K$-$Ss_1$ |
| ⋮ | ⋮ | $Sc_{2K-1}$-$Sc_K$,$Ss_{2K}$-$Ss_{K+1}$ |
| $PW_{f-1}$-$PW_{f-K}$, $Mc_{f-2}$-$Mc_{f-K-1}$,$Ms_{f-1}$-$Ms_{f-K}$ | ⋮ | ⋮ |
| $AW_{K-1}$-$AW_0$, $Sc_{K-1}$-$Sc_0$,$Ss_K$-$Ss_1$ | $q_0$,$PW_{f-1}$-$PW_{f-K}$, $Mc_{f-2}$-$Mc_{f-K-1}$, $Ms_{f-1}$-$Ms_{f-K}$ | ⋮ |
| $AW_{2K-1}$-$AW_K$, $Sc_{2K-1}$-$Sc_K$,$Ss_{2K}$-$Ss_{K+1}$ | $BW_1$,$AW_{K-1}$-$AW_0$, $Sc_{K-1}$-$Sc_0$,$Ss_K$-$Ss_1$ | $Sc_{f-1}$-$Sc_{f-K}$,$Ss_{f-1}$-$Ss_{f-K+1}$ |
| ⋮ | $BW_1$,$AW_{2K-1}$-$AW_K$, $Sc_{2K-1}$-$Sc_K$,$Ss_{2K}$-$Ss_{K+1}$ | $Mc_{K-2}$-$Mc_0$,$Ms_{K-1}$-$Ms_0$ |
| ⋮ | ⋮ | $Mc_{2K-2}$-$Mc_{K-1}$,$Ms_{2K-1}$-$Ms_K$ |
| ⋮ | ⋮ | ⋮ |
| $PW_{f-1}$-$PW_{f-K}$, $Mc_{f-2}$-$Mc_{f-K-1}$,$Ms_{f-1}$-$Ms_{f-K}$ | $q_0$,$PW_{f-K-1}$-$PW_{f-2K}$, $Mc_{f-K-2}$-$Mc_{f-2K-1}$,$Ms_{f-K-1}$-$Ms_{f-2K}$ | $Sc_{f-2K-1}$-$Sc_{f-3K}$,$Ss_{f-2K}$-$Ss_{f-3K+1}$ |
| ⋮ | ⋮ | $Sc_{f-K-1}$-$Sc_{f-2K}$,$Ss_{f-K}$-$Ss_{f-2K+1}$ |
| ⋮ | ⋮ | $Sc_{f-1}$-$Sc_{f-K}$,$Ss_{f-1}$-$Ss_{f-K+1}$ |

FIG. 7

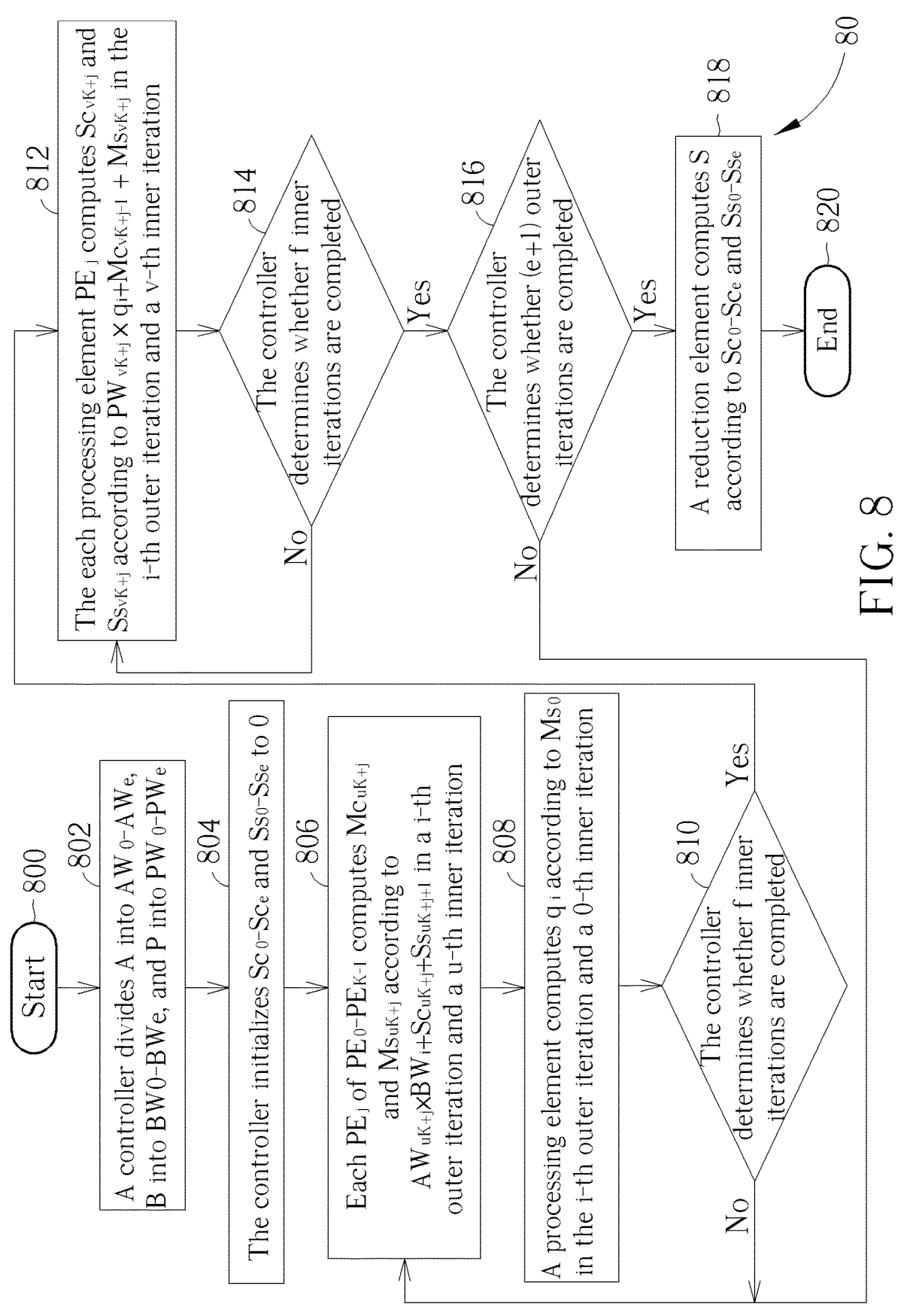

812 — The each processing element $PE_J$ computes $Sc_{vK+j}$ and $Ss_{vK+j}$ according to $PW_{vK+j} \times q_i + Mc_{vK+j-1} + Ms_{vK+j}$ in the i-th outer iteration and a v-th inner iteration 814 — The controller determines whether f inner iterations are completed 816 — The controller determines whether (e+1) outer iterations are completed 818 — A reduction element computes S according to $Sc_0$–$Sc_e$ and $Ss_0$–$Ss_e$ 820 — End

80

Start — 800

802 — A controller divides A into $AW_0$–$AW_e$, B into $BW_0$–$BW_e$, and P into $PW_0$–$PW_e$ 804 — The controller initializes $Sc_0$–$Sc_e$ and $Ss_0$–$Ss_e$ to 0

806 — Each $PE_J$ of $PE_0$–$PE_{K-1}$ computes $Mc_{uK+j}$ and $Ms_{uK+j}$ according to $AW_{uK+j} \times BW_i + Sc_{uK+j} + Ss_{uK+j+1}$ in a i-th outer iteration and a u-th inner iteration 808 — A processing element computes $q_i$ according to $Ms_0$ in the i-th outer iteration and a 0-th inner iteration 810 — The controller determines whether f inner iterations are completed

FIG. 8

DEVICE AND METHOD OF HANDLING A MODULAR MULTIPLICATION

CROSS REFERENCE TO RELATED APPLICATIONS

This application claims the benefit of U.S. Provisional Application No. 63/094,355, filed on Oct. 21, 2020 and incorporated herein by reference.

BACKGROUND OF THE INVENTION

1. Field of the Invention

The present invention relates to a computing device, and more particularly, to a modular operation device and a method of handling a modular multiplication.

2. Description of the Prior Art

Modular multiplications of large operands are widely used in public-key cryptosystems. For example, operations of a modular multiplication may comprise computing carry results and sum results iteratively, and a resulting remainder may be computed according to the sum results. However, computations of a carry result and a sum result corresponding to a word depend on other carry results and other sum results corresponding to other words. The modular multiplication is implemented inefficiently. Thus, an efficient modular multiplication is an important problem to be solved.

SUMMARY OF THE INVENTION

The present invention therefore provides a device and a method of handling a modular multiplication to solve the abovementioned problem.

A modular operation device for handling a modular multiplication comprises a controller, configured to divide a multiplicand into a plurality of multiplicand words, a multiplier into a plurality of multiplier words, and a modulus into a plurality of modulus words; a first plurality of processing elements, coupled to the controller, configured to compute a first plurality of updated carry results and a first plurality of updated sum results according to the plurality of multiplicand words, a multiplier word of the plurality of multiplier words, a first plurality of carry results and a first plurality of sum results, wherein at least two of the first plurality of processing elements compute at least two of the first plurality of updated carry results in parallel according to the multiplier word and at least two multiplicand words of the plurality of multiplicand words, and compute at least two of the first plurality of updated sum results in parallel according to the multiplier word and the at least two multiplicand words; a second plurality of processing elements, coupled to the controller, configured to compute a second plurality of updated carry results and a second plurality of updated sum results according to the plurality of modulus words, the first plurality of updated carry results and the first plurality of updated sum results; and a reduction element, coupled to the controller, configured to compute a resulting remainder according to the second plurality of updated carry results and the second plurality of updated sum results.

A modular operation device for handling modular multiplication comprises a controller, configured to divide a multiplicand into a plurality of multiplicand blocks, a multiplier into a plurality of multiplier blocks, and a modulus into a plurality of modulus blocks; a processing element, coupled to the controller, configured to execute instructions of: computing a first plurality of sum results according to a first multiplicand block of the plurality of multiplicand blocks, a first multiplier block of the plurality of multiplier blocks and a first modulus block of the plurality of modulus blocks; computing a second plurality of sum results and a plurality of delayed sum results according to a second multiplicand block of the plurality of multiplicand blocks, the first multiplier block and a second modulus block of the plurality of modulus blocks; computing a first plurality of updated sum results according to the first plurality of sum results, the plurality of delayed sum results, the first multiplicand block, a second multiplier block of the plurality of multiplier blocks and the first modulus block; computing a second plurality of updated sum results and a plurality of updated delayed sum results according to the second plurality of sum results, the second multiplicand block, the second multiplier block and the second modulus block; and a reduction element, coupled to the controller and the processing element, configured to compute a resulting remainder according to the first plurality of updated sum results, the second plurality of updated sum results and the plurality of updated delayed sum results.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a table of parallel processing of processing elements according to an example of the present invention.

FIG. 4 are schematic diagrams of data flows of parallel processing of processing elements according to an example of the present invention.

FIG. 7 is a schedule table of operations of a modular multiplication according to an example of the present invention.

FIG. 8 is a flowchart of a process according to an example of the present invention.

DETAILED DESCRIPTION

Figure 1:
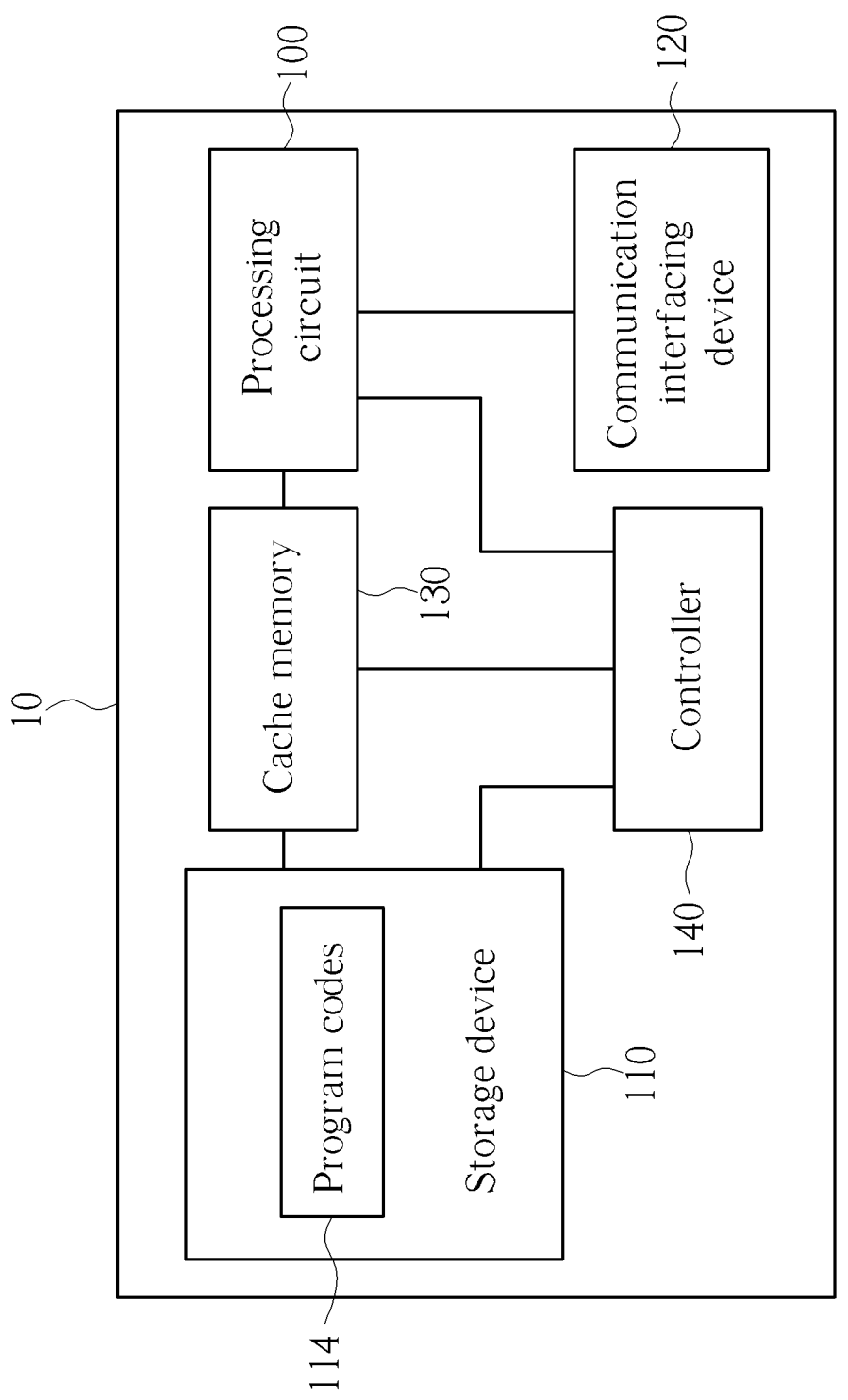
FIG. 1 is a schematic diagram of a modular operation device according to an example of the present invention.

FIG. 1 is a schematic diagram of a modular operation device 10 according to an example of the present invention. The modular operation device 10 may include at least one processing circuit (e.g., unit or element) 100, at least one storage device 110, at least one communication interfacing device 120, at least one cache memory 130 and at least one controller 140. The at least one processing circuit 100 may be a (micro)processor, multi-core processor, Application Specific Integrated Circuit (ASIC) or Central Processing Unit (CPU) The at least one storage device 110 may be any data storage device that may store program codes 114 which are accessed and executed by the at least one processing circuit 100. Examples of the at least one storage device 110 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 120 is preferably at least one transceiver and is used to transmit and receive signals (e.g., data, messages and/or packets) according to processing results of the at least one processing circuit 100. The at least one cache memory 130 may be any type of cache memory (L1/L2/L3/L4/L5/L #). The at least one cache memory 130 may be accessed and executed by the at least one processing circuit 100, and may be connected directly with, in close proximity to or integrated as part of the at least one processing circuit 100. The at least one controller 140 may control the components included in the modular operation device 10.

According to a modular multiplication, operations of implementing the modular multiplication comprise computing carry results and sum results iteratively, and a resulting remainder may be computed according to the sum results. For example, a carry result $C_{j-1}$ corresponding to a less significant word (e.g., 32 bits or 64 bits) a carry result $C_j$ and a sum result $S_j$ corresponding to a word, and a sum result $S_{j+1}$ corresponding to a more significant word are computed iteratively. However, the sum result $S_j$ is computed based on the carry result $C_{j-1}$. In addition, the sum result $S_j$ in a i-th iteration is computed based on the sum result $S_{j+1}$ in a (i−1)-th iteration. The modular multiplication may be a Montgomery multiplication, but is not limited herein.

Figure 2:
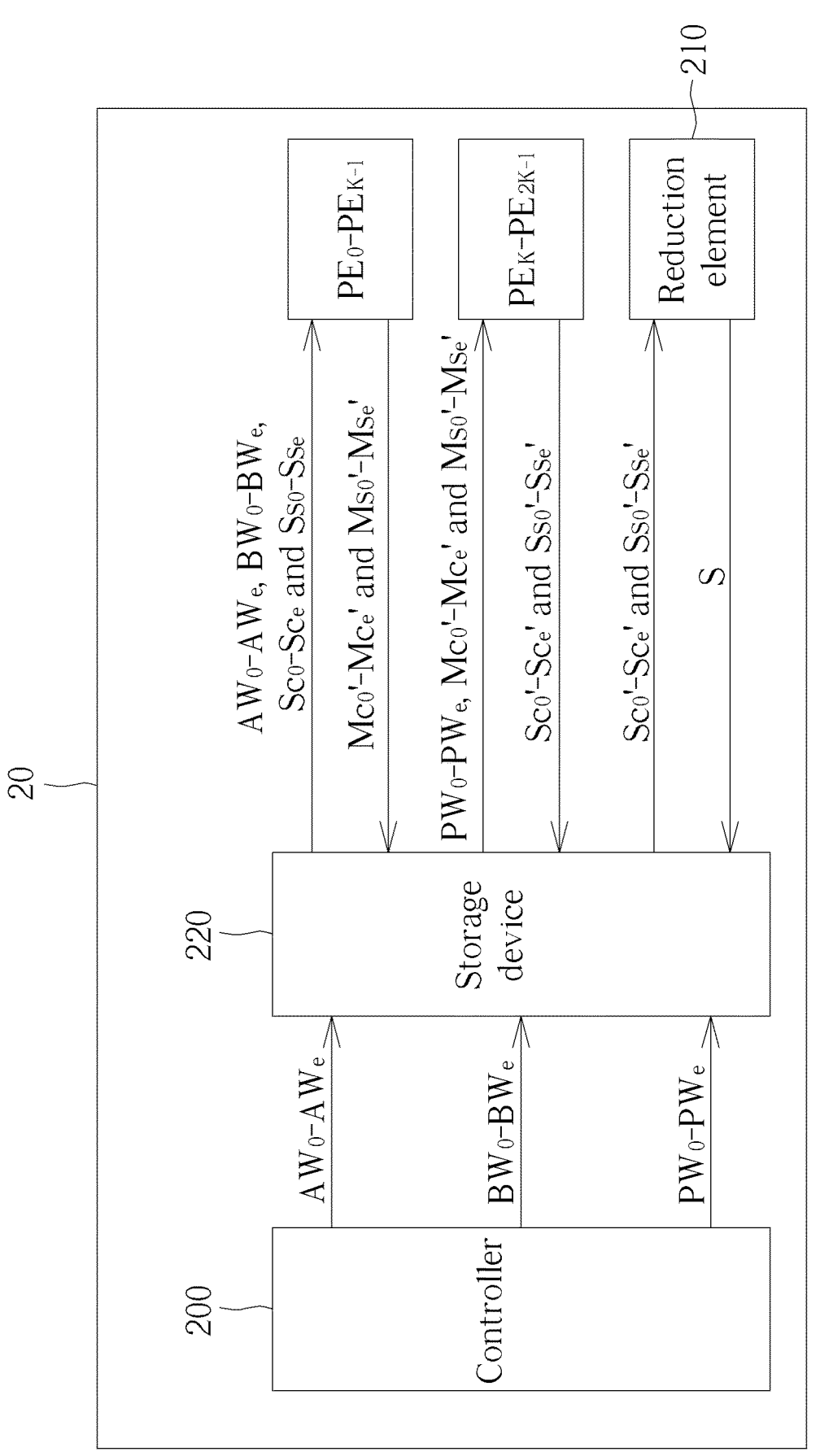
FIG. 2 is a schematic diagram of operations of a modular operation device according to an example of the present invention.

FIG. 2 is a schematic diagram of operations of a modular operation device 20 according to an example of the present invention. In FIG. 2, the modular operation device 20 comprises K processing elements $PE_0$-$PE_{K-1}$, K processing elements $PE_K$-$PE_{2K-1}$, a controller 200, a reduction element 210 and at least one storage device (e.g., main memory) 220, wherein K≥2. The controller 200 is coupled to the processing elements $PE_0$-$PE_{K-1}$, the processing elements $PE_K$-$PE_{2K-1}$ the reduction element 210 and the at least one storage device 220.

In detail, the modular operation device 20 is (used) for computing a modular multiplication (i.e., remainder) of a multiplicand A and a multiplier B with respect to a modulus P based on a Montgomery multiplication algorithm. The controller 200 is configured to divide the multiplicand A into (e+1) multiplicand words $AW_0$-$AW_e$, the multiplier B into (e+1) multiplier words $BW_0$-$BW_e$, and the modulus P into (e+1) modulus words $PW_0$-$PW_e$, wherein e≥1. The processing elements $PE_0$-$PE_{K-1}$ are configured to compute (e+1) updated carry results $Mc_0'$-$Mc_e'$ and (e+1) updated sum results $Ms_0'$-$Ms_e'$ according to the multiplicand words $AW_0$-$AW_e$, a multiplier word $BW_i$ of the (e+1) multiplier words $BW_0$-$BW_e$, (e+1) carry results $Sc_0$-$Sc_e$ and (e+1) sum results $Ss_0$-$Ss_e$ (e.g., respectively). The processing elements $PE_K$-$PE_{2K-1}$ are configured to compute (e+1) updated carry results $Sc_0'$-$Sc_e'$ and (e+1) updated sum results $Ss_0'$-$Ss_e'$ according to the modulus words $PW_0$-$PW_e$, the updated carry results $Mc_0'$-$Mc_e'$ and the updated sum results $Ms_0'$-$Ms_e'$ (e.g., respectively). Then, the reduction element 210 is configured to compute a resulting remainder S according to the updated carry results $Sc_0'$-$Sc_e'$ and the updated sum results $Ss_0'$-$Ss_e'$. That is, a two-step method is used for computing carry results and sum results. Thus, the problem regarding computing of iterative carry results and sum results is solved.

In one example, the processing elements $PE_0$-$PE_{K-1}$ and the processing elements $PE_K$-$PE_{2K-1}$ are the same.

In one example, the multiplicand A is an n-bit integer. In one example, each of the multiplicand words $AW_0$-$AW_e$ is a w-bit integer. In one example, a word number (e+1) of the (e+1) multiplicand words $AW_0$-$AW_e$ is obtained according to the w. For example, e=⌈n/w⌉, wherein ⌈•⌉ is a ceiling function. Note that word numbers and bit lengths of the (e+1) multiplicand words $AW_0$-$AW_e$, the (e+1) multiplier words $BW_0$-$BW_e$ and the (e+1) modulus words $PW_0$-$PW_e$ may be changed according to system requirements, and are not limited herein.

In one example, there is a (one-to-one) correspondence between the multiplicand words $AW_0$-$AW_e$, the updated carry results $Mc_0'$-$Mc_e'$ and the updated sum results $Ms_0'$-$Ms_e'$. In one example, there is a (one-to-one) correspondence between the modulus words $PW_0$-$PW_e$, the updated carry results $Sc_0'$-$Sc_e'$ and the updated sum results $Ss_0'$-$Ss_e'$.

FIG. 3 is a table 30 of parallel processing of processing elements according to an example of the present invention. In detail, an element number K of the processing elements $PE_0$-$PE_{K-1}$ is not greater than a word number (e+1) of the (e+1) multiplicand words $AW_0$-$AW_e$. That is, a processing element of the processing elements $PE_0$-$PE_{K-1}$ computes at least one of the updated carry results $Mc_0'$-$Mc_e'$ and at least one of the updated sum results $Ms_0'$-$Ms_e'$. In one example, a number f of the at least one of the updated carry results $Mc_0'$-$Mc_e'$ and a number f of the at least one of the updated sum results $Ms_0'$-$Ms_e'$ are obtained according to the word number (e+1) and the element number K. For example, a processing element $PE_0$ computes updated carry results $Mc_0'$, $Mc_K'$, . . . , $Mc_{f-K}'$, wherein f=⌈(e+1)/K⌉. In one example, the processing elements $PE_0$-$PE_{K-1}$ compute the updated carry results $Mc_0'$-$Mc_e'$ and the updated sum results $Ms_0'$-$Ms_e'$ according to the element number, a plurality of element indices corresponding to the processing elements $PE_0$-$PE_{K-1}$ and a plurality of word indices corresponding to the multiplicand words $AW_0$-$AW_e$. In one example, a processing element $PE_k$ corresponding to an element index k computes an updated carry result $Mc_j'$ and an updated sum result $Ms_j'$ corresponding to an index j, wherein the element index k is equal to a remainder obtained by dividing the index j by the element number, i.e., k=j (mod K). In one example, at least two of the processing elements $PE_0$-$PE_{K-1}$ compute at least two of the updated carry results $Mc_0'$-$Mc_e'$ in parallel (e.g., simultaneously) according to the multiplier word BW; and at least two multiplicand words of the (e+1) multiplicand words $AW_0$-$AW_e$, and compute at least two of the updated sum results $Ms_0'$-$Ms_e'$ in parallel according to the multiplier word BW; and the at least two multiplicand words. In one example, a number of the at least two of the processing elements $PE_0$-$PE_{K-1}$, a number of the at least two of the updated carry results $Mc_0'$-$Mc_e'$ and a number of the at least two of the updated carry results $Ms_0'$-$Ms_e'$ are the same. Note that the at least two of the processing elements $PE_0$-$PE_{K-1}$ may perform parallel computing at least one time. For example, processing elements $PE_0$-$PE_1$ compute updated carry results $Mc_0'$-$Mc_1'$ in parallel, and compute updated carry results $Mc_{f-K}'$-$Mc_{f-K+1}'$ in parallel.

In one example, an element number K of the processing elements $PE_K$-$PE_{2K-1}$ is not greater than a word number (e+1) of the modulus words $PW_0$-$PW_e$. That is, a processing element of the processing elements $PE_K$-$PE_{2K-1}$ computes at least one of the updated carry results $Sc_0'$-$Sc_e'$ and at least one of the updated sum results $Ss_0'$-$Ss_e'$. In one example, a number f of the at least one of the updated carry results $Sc_0'$-$Sc_e'$ and a number f of the at least one of the updated sum results $Ss_0'$-$Ss_e'$ are obtained according to the word number (e+1) and the element number K. For example, a processing element $PE_K$ computes updated carry results $Sc_0'$, $Sc_{K'}$, . . . , $Sc_{f-K'}$, wherein f=⌈(e+1)/K⌉. In one example, the processing elements $PE_K$-$PE_{2K-1}$ compute the updated carry results $Sc_0'$-$Sc_e'$ and the updated sum results $Ss_0'$-$Ss_e'$ according to the element number, a plurality of element indices corresponding to the processing elements $PE_K$-$PE_{2K-1}$ and a plurality of word indices corresponding to the multiplicand words $PW_0$-$PW_e$. In one example, a processing element $PE_k$ corresponding to an element index k computes an updated carry result $Sc_j'$ and an updated sum result $Ss_j'$ corresponding to an index j, wherein the element index k is equal to a remainder obtained by dividing the index j by the element number, i.e., k=j (mod K). In one example, at least two of the processing elements $PE_K$-$PE_{2K-1}$ compute at least two of the updated carry results $Sc_0'$-$Sc_e'$ in parallel (e.g., simultaneously) according to at least two of the updated carry results $Mc_0'$-$Mc_e'$ and at least two of the updated sum results $Ms_0'$-$Ms_e'$, and compute at least two of the updated sum results $Ss_0'$-$Ss_e'$ in parallel. In one example, a number of the at least two of the processing elements $PE_K$-$PE_{2K-1}$, a number of the at least two of the updated carry results $Sc_0'$-$Sc_e'$ and a number of the at least two of the updated sum results $Ss_0'$-$Ss_e'$ are the same. Note that the at least two of the processing elements $PE_K$-$PE_{2K-1}$ may perform parallel computing at least one time. For example, processing elements $PE_K$-$PE_K$+1 compute updated carry results $Sc_0'$-$Sc_1'$ in parallel, and compute updated carry results $Sc_2'$-$Sc_3'$ in parallel. Note that the K processing elements $PE_0$-$PE_{K-1}$ and the K processing elements $PE_K$-$PE_{2K-1}$ in FIG. 3 are assumed to be the same for simplifying the example, but are not limited herein.

According to the above description, data flows of parallel processing of processing elements are shown in FIG. 4.

In one example, the processing elements $PE_0$-$PE_{K-1}$ compute the updated carry results $Mc_0'$-$Mc_e'$ and the updated sum results $Ms_0'$-$Ms_e'$ according to the plurality of multiplier words $BW_0$-$BW_e$, the multiplicand words $AW_0$-$AW_e$, the carry results $Sc_0$-$Sc_e$ and (e+1) shifted sum results $\widetilde{Ss}_0$-$\widetilde{Ss}_e$ of the sum results $Ss_0$-$Ss_e$ (e.g., respectively). In one example, the shifted sum results $\widetilde{Ss}_0$-$\widetilde{Ss}_e$ are obtained by dividing the sum results $Ss_0$-$Ss_e$ by a radix $2^w$ (i.e., right-shifted by one word) (e.g., in a radix-$2^w$ system). For example, $\widetilde{Ss}_j$=$Ss_{j+1}$. Note that a most significant shifted sum result $\widetilde{Ss}_e$ of the shifted sum results $\widetilde{Ss}_0$-$\widetilde{Ss}_e$ is 0. Practically, the shifted sum results $\widetilde{Ss}_0$-$\widetilde{Ss}_e$ may be obtained according to at least one delayed element, at least one flip flop or at least one register.

In one example, each of the updated carry results $Mc_0'$-$Mc_e'$ and each of the updated sum results $Ms_0'$-$Ms_e'$ are computed according to the following instructions: multiplying a multiplicand word $AW_j$ of the multiplicand words with the multiplier word $BW_i$ of the multiplier words to obtain a multiplication, adding a carry result $Sc_j$ of the carry results $Sc_0$-$Sc_e$ and a shifted sum result $\widetilde{Ss}_j$ of the shifted sum results $\widetilde{Ss}_0$-$\widetilde{Ss}_e$ to the multiplication to obtain a number, dividing the number by a radix $2^w$ to obtain a quotient and a remainder, determining the quotient as an updated carry result $Mc_j'$ of the updated carry results $Mc_0'$-$Mc_e'$, and determining the remainder as an updated sum result $Ms_j'$ of the updated sum results $Ms_0'$-$Ms_e'$. Note that i is a multiplier word index. Thus, the above description can be stated according to the following equation:

$$AW_j \times BW_i + Sc_j + Ss_{j+1} = Mc_j' 2^w + Ms_j' \qquad \text{(Eq. 1)}$$

In one example, the processing elements $PE_0$-$PE_{K-1}$ are further configured to compute an extra quotient $q_i$ according to a least significant result $Ms_0'$ of the updated sum results $Ms_0'$-$Ms_e'$ and an inverse word. The inverse word is a remainder of an inverse of a least significant word $PW_0$ of the modulus words $PW_0$-$PW_e$ divided by a radix $2^w$. Thus, the computation of the extra quotient $q_i$ can be stated according to the following equation:

$$(Ms_0' \times (-PW_0^{-1} \bmod 2^w)) \bmod 2^w = q_i \qquad \text{(Eq. 2)}$$

In one example, there is a (one-to-one) correspondence between the extra quotient $q_i$ and a multiplier word $BW_i$ of the multiplier words $BW_0$-$BW_e$, wherein the least significant result $Ms_0'$ is computed according to the multiplier word $BW_i$. In one example, the processing elements $PE_0$-$PE_{K-1}$ compute the extra quotient $q_i$ one time in (e.g., during) an iteration corresponding to the multiplier word $BW_i$. In one example, all of the carry results $Sc_0$-$Sc_e$ and all of the sum results $Ss_0$-$Ss_e$ are initialized to 0.

In one example, the processing elements $PE_K$-$PE_{2K-1}$ compute the updated carry results $Sc_0'$-$Sc_e'$ and the updated sum results $Ss_0'$-$Ss_e'$ according to the extra quotient $q_i$, the modulus words $PW_0$-$PW_e$, (e+1) shifted updated carry results $\widetilde{Mc}_0'$-$\widetilde{Mc}_e'$ of the updated carry results $Mc_0'$-$Mc_e'$ and the updated sum results $Ms_0'$-$Ms_e'$ (e.g., respectively). In one example, the shifted updated carry results $\widetilde{Mc}_0'$-$\widetilde{Mc}_e'$ are obtained by multiplying the updated carry results $Mc_0'$-$Mc_e'$ with a radix $2^w$ (i.e., left-shifted by one word). For example, $\widetilde{Mc}_j'$=$Mc_{j-1}'$. Note that a least significant carry result $\widetilde{Mc}_0'$ of the shifted updated carry results $\widetilde{Mc}_0'$-$\widetilde{Mc}_e'$ is 0. Practically, the shifted updated carry results $\widetilde{Mc}_0'$-$\widetilde{Mc}_e'$ may be obtained according to at least one delayed element, at least one flip flop or at least one register.

In one example, each of the updated carry results $Sc_0'$-$Sc_e'$ and each of the updated sum results $Ss_0'$-$Ss_e'$ are computed according to the following instructions: multiplying a modulus word $PW_j$ of the modulus words with an extra quotient $q_i$ to obtain a multiplication, adding a shifted updated carry result $\widetilde{Mc_0}'$ of the shifted updated carry results $\widetilde{Mc_0}'$-$\widetilde{Mc_e}'$ and a sum result $Ms_j'$ of the updated sum results $Ms_0'$-$Ms_e'$ to the multiplication to obtain a number, dividing the number by a radix $2^w$ to obtain a quotient and a remainder, determining the quotient as an updated carry result $Sc_j'$ of the updated carry results $Sc_0'$-$Sc_e'$, and determining the remainder as an updated sum result $Ss_j'$ of the updated sum results $Ss_0'$-$Ss_e'$. The extra quotient $q_i$ is generated according to a least significant result of the updated sum results $Ms_0'$-$Ms_e'$ and an inverse word, and the inverse word is a remainder of an inverse of a least significant word of the plurality of modulus words divided by the radix $2^w$. Thus, the above description can be stated according to the following equation:

$$PW_j \times q_i + Mc_{j-1}' + Ms_j' = Sc_j' 2^w + Ss_j' \qquad \text{(Eq. 3)}$$

Figure 5:
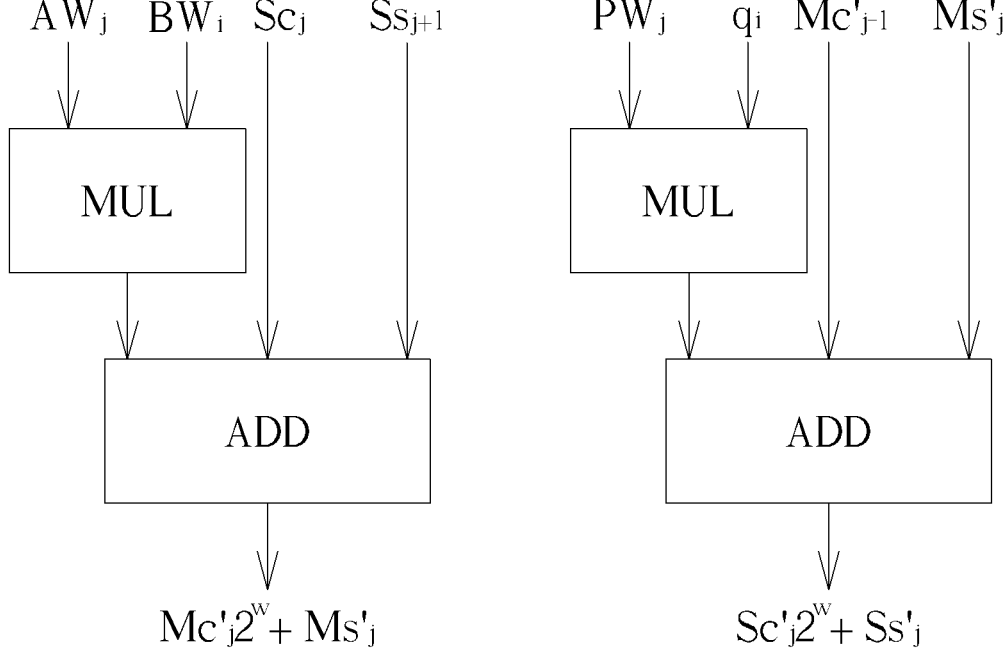
FIG. 5 are schematic diagrams of processing elements according to an example of the present invention.

FIG. 5 are schematic diagrams of processing elements according to an example of the present invention. In detail, each of the processing elements $PE_0$-$PE_{K-1}$ comprises a multiplier for multiplying the multiplicand word $AW_j$ with the multiplier word $BW_i$, and an adder for adding the carry result $Sc_j$, the shifted sum result $\widetilde{Ss}_j$ and the multiplication. That is, the each of the processing elements $PE_0$-$PE_{K-1}$ performs a multiply-and accumulation (MAC) operation. In addition, each of the processing elements $PE_K$-$PE_{2K-1}$ comprises a multiplier for multiplying the modulus word $PW$ with the extra quotient $q_i$, and an adder for adding the shifted updated carry result $\widetilde{Mc_j}'$, the sum result $Ms_j'$ and the multiplication. That is, the each of the processing elements $PE_K$-$PE_{2K-1}$ performs a MAC operation. Note that the computation of the extra quotient $q_i$ in (Eq.2) may be performed by the multiplier in FIG. 5 or may be performed by an extra multiplier (not shown in FIG. 5).

According to the above description, the following equations can be obtained:

$$\begin{bmatrix} AW_0 \\ AW_1 \\ \vdots \\ AW_e \end{bmatrix} BW_i + \begin{bmatrix} Sc_0 \\ Sc_1 \\ \vdots \\ Sc_e \end{bmatrix} + \begin{bmatrix} Ss_1 \\ Ss_2 \\ \vdots \\ 0 \end{bmatrix} = \begin{bmatrix} Mc'_0 \\ Mc'_1 \\ \vdots \\ Mc'_e \end{bmatrix} 2^w + \begin{bmatrix} Ms'_0 \\ Ms'_1 \\ \vdots \\ Ms'_e \end{bmatrix} \qquad \text{(Eq. 4)}$$

$$\begin{bmatrix} PW_0 \\ PW_1 \\ \vdots \\ PW_e \end{bmatrix} q_i + \begin{bmatrix} 0 \\ Mc'_0 \\ \vdots \\ Mc'_{e-1} \end{bmatrix} + \begin{bmatrix} Ms'_0 \\ Ms'_1 \\ \vdots \\ Ms'_e \end{bmatrix} = \begin{bmatrix} Sc'_0 \\ Sc'_1 \\ \vdots \\ Sc'_e \end{bmatrix} 2^w + \begin{bmatrix} Ss'_0 \\ Ss'_1 \\ \vdots \\ Ss'_e \end{bmatrix} \qquad \text{(Eq. 5)}$$

In one example, the processing elements $PE_K$-$PE_{2K-1}$ compute the carry results $Sc_0$-$Sc_e$ and the sum results $Ss_0$-$Ss_e$ in a i-th iteration corresponding to a first word $BW_i$ of the multiplier words. Then, the processing elements $PE_0$-$PE_{K-1}$ compute the updated carry results $Mc_0'$-$Mc_e'$ and the updated sum results $Ms_0'$-$Ms_e'$ in a (i+1)-th iteration corresponding to a second (e.g., next) word $BW_{i+1}$ of the multiplier words, and the processing elements $PE_K$-$PE_{2K-1}$ compute the updated carry results $Sc_0'$-$Sc_e'$ and the updated sum results $Ss_0'$-$Ss_e'$ in the second iteration.

Figure 6:
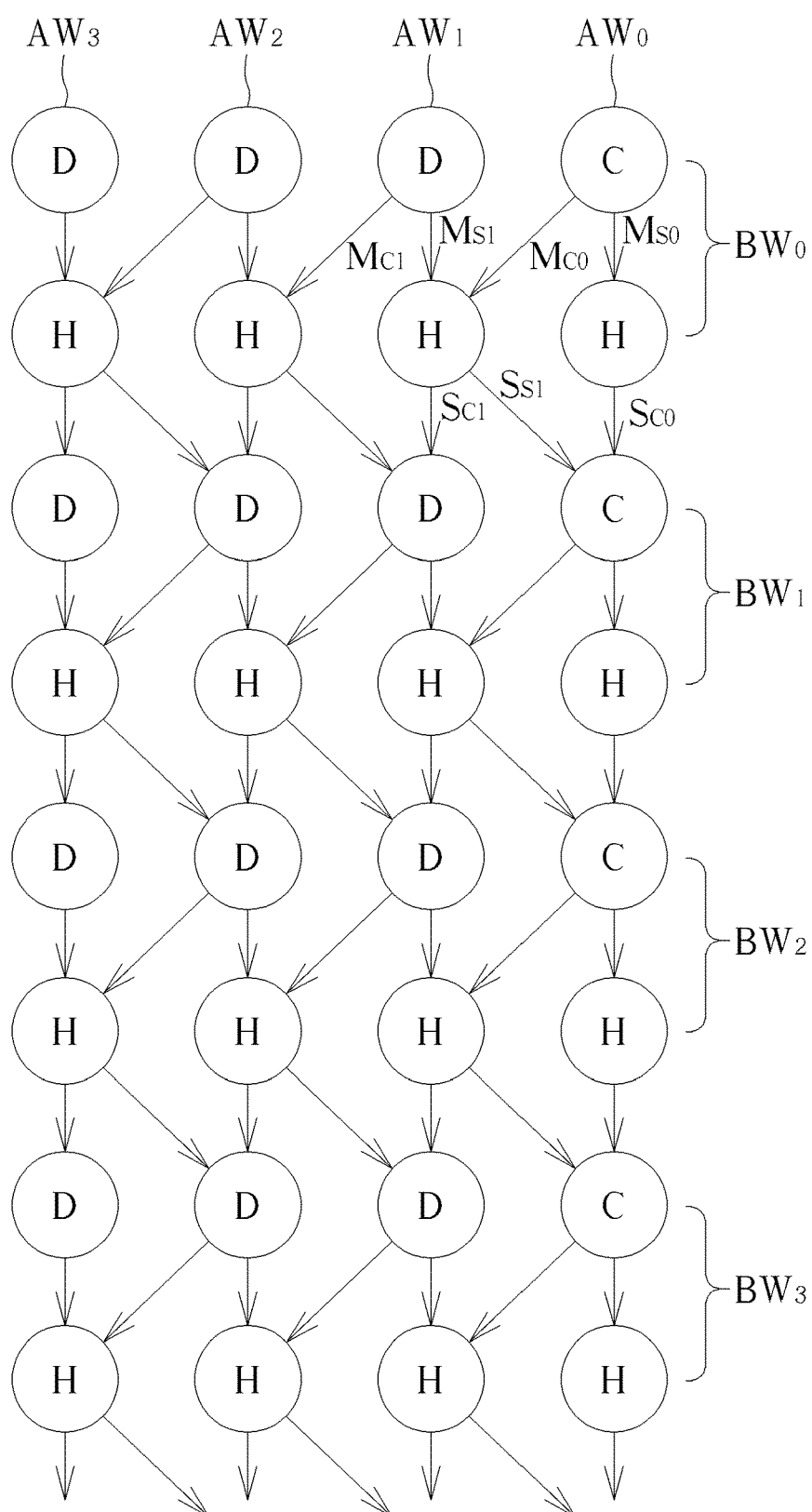
FIG. 6 is a schematic diagram of data dependency of carry results and sum results according to an example of the present invention.

According to the above description, data dependency of carry results and sum results according to an example of the present invention are shown in FIG. 6. In FIG. 6, an operation performed by the processing element $PE_0$ is represented by a C task. Operations performed by the processing element $PE_1$-$PE_{K-1}$ are represented by a D task. Operations performed by the processing element $PE_K$-$PE_{2K-1}$ are represented by a H task. Note that a number of multiplicand words $AW_0$-$AW_3$, a number of multiplier words $BW_0$-$BW_3$ and a number of processing elements (i.e., 4) are assumed to be the same for simplifying the example, but are not limited herein.

In one example, the reduction element 210 computes the resulting remainder S, after the processing elements $PE_K$-$PE_{2K-1}$ compute the updated carry results $Sc_0'$-$Sc_e'$ and the updated sum results $Ss_0'$-$Ss_e'$ in a last iteration corresponding to a most significant word $BW_e$ of the multiplier words. In one example, the reduction element 210 computes the resulting remainder S according to a plurality of weightings corresponding to the updated carry results $Sc_0'$-$Sc_e'$ and a plurality of weightings corresponding to the updated sum results $Ss_0'$-$Ss_e'$. For example, a weighting $2^{jw}$ is corresponding to an updated carry result $Sc_j'$ and an updated sum result $Ss_{j+1}'$. Thus, the above description can be stated according to the following equation:

$$S = \begin{bmatrix} Sc_0 \\ Sc_1 \\ \vdots \\ Sc_e \end{bmatrix} + \begin{bmatrix} Ss_1 \\ Ss_2 \\ \vdots \\ 0 \end{bmatrix} \qquad \text{(Eq. 6)}$$

FIG. 7 is a schedule table 70 of operations of a modular multiplication according to an example of the present invention. In detail, the processing elements $PE_0$-$PE_{K-1}$ compute the updated carry results $Mc_0'$-$Mc_e'$ and the updated sum results $Ms_0'$-$Ms_e'$, after accessing (e.g., reading) the multiplicand words $AW_0$-$AW_e$, the carry results $Sc_0$-$Sc_e$ and the sum results $Ss_0$-$Ss_e$ (e.g., loaded, stored) in the at least one storage device 220. The processing elements $PE_K$-$PE_{2K-1}$ compute the updated carry results $Sc_0'$-$Sc_e'$ and the updated sum results $Ss_0'$-$Ss_e'$, after accessing the modulus words $PW_0$-$PW_e$, the updated carry results $Mc_0'$-$Mc_e'$ and the updated sum results $Ms_0'$-$Ms_e'$ in the at least one storage device 220. The reduction element 210 computes the resulting remainder S, after accessing the updated carry results $Sc_0'$-$Sc_e'$ and the updated sum results $Ss_0'$-$Ss_e'$ in the at least one storage device 220. In addition, the processing elements $PE_0$-$PE_{K-1}$ store (e.g., write) the updated carry results $Mc_0'$-$Mc_e'$ and the updated sum results $Ms_0'$-$Ms_e'$ in the at least one storage device 220 in a first order, after computing the updated carry results $Mc_0'$-$Mc_e'$ and the updated sum results $Ms_0'$-$Ms_e'$. The processing elements $PE_K$-$PE_{2K-1}$ store the updated carry results $Sc_0'$-$Sc_e'$ and the updated sum results $Ss_0'$-$Ss_e'$ in the at least one storage device 220 in a second order, after computing the updated carry results $Sc_0'$-$Sc_e'$ and the updated sum results $Ss_0'$-$Ss_e'$. Then, the reduction element 210 stores the resulting remainder S in the at least one storage device 220, after computing the resulting remainder S. Note that orders for storing iterative sum results and iterative carry results in FIG. 7 may be changed according to system requirements, and are not limited herein.

Operations of the modular operation device in the above examples can be summarized into a process 80 shown in FIG. 8, and can be compiled into the program codes 114. The process 80 includes the following steps:

Step 800: Start.

Step 802: A controller divides A into $AW_0$-$AW_e$, B into $BW_0$-$BW_e$, and divides P into $PW_0$-$PW_e$.

Step 804: The controller initializes $Sc_0$-$Sc_e$ and $Ss_0$-$Ss_e$ to 0.

Step 806: Each processing element $PE_K$ of $PE_0$-$PE_{K-1}$ computes $Mc_{uK+j}$ and $Ms_{uK+j}$ according to $AW_{uK+j} \times BW_i + Sc_{uK+j} + Ss_{uK+j+1}$ in a i-th outer iteration and a u-th inner iteration.

Step 808: A processing element $PE_0$ computes $q_i$ according to $Ms_0$ in the i-th outer iteration and a 0-th inner iteration.

Step 810: The controller determines whether f inner iterations are completed. If yes, perform Step 812, otherwise, perform Step 806.

Step 812: The each processing element $PE_j$ computes $Sc_{vK+j}$ and $Ss_{vK+j}$ according to $PW_{vK+j} \times q_i + Mc_{vK+j-1} + Ms_{vK+j}$ in the i-th outer iteration and a v-th inner iteration.

Step 814: The controller determines whether f inner iterations are completed. If yes, perform Step 816, otherwise, perform Step 812.

Step 816: The controller determines whether (e+1) outer iterations are completed. If yes, perform Step 818, otherwise, perform Step 806.

Step 818: A reduction element computes S according to $Sc_0$-$Sc_e$ and $Ss_0$-$Ss_e$.

Step 820: End.

Detailed operations and variations of the process 80 can be referred to the above illustration, and are not narrated herein.

Figure 9:
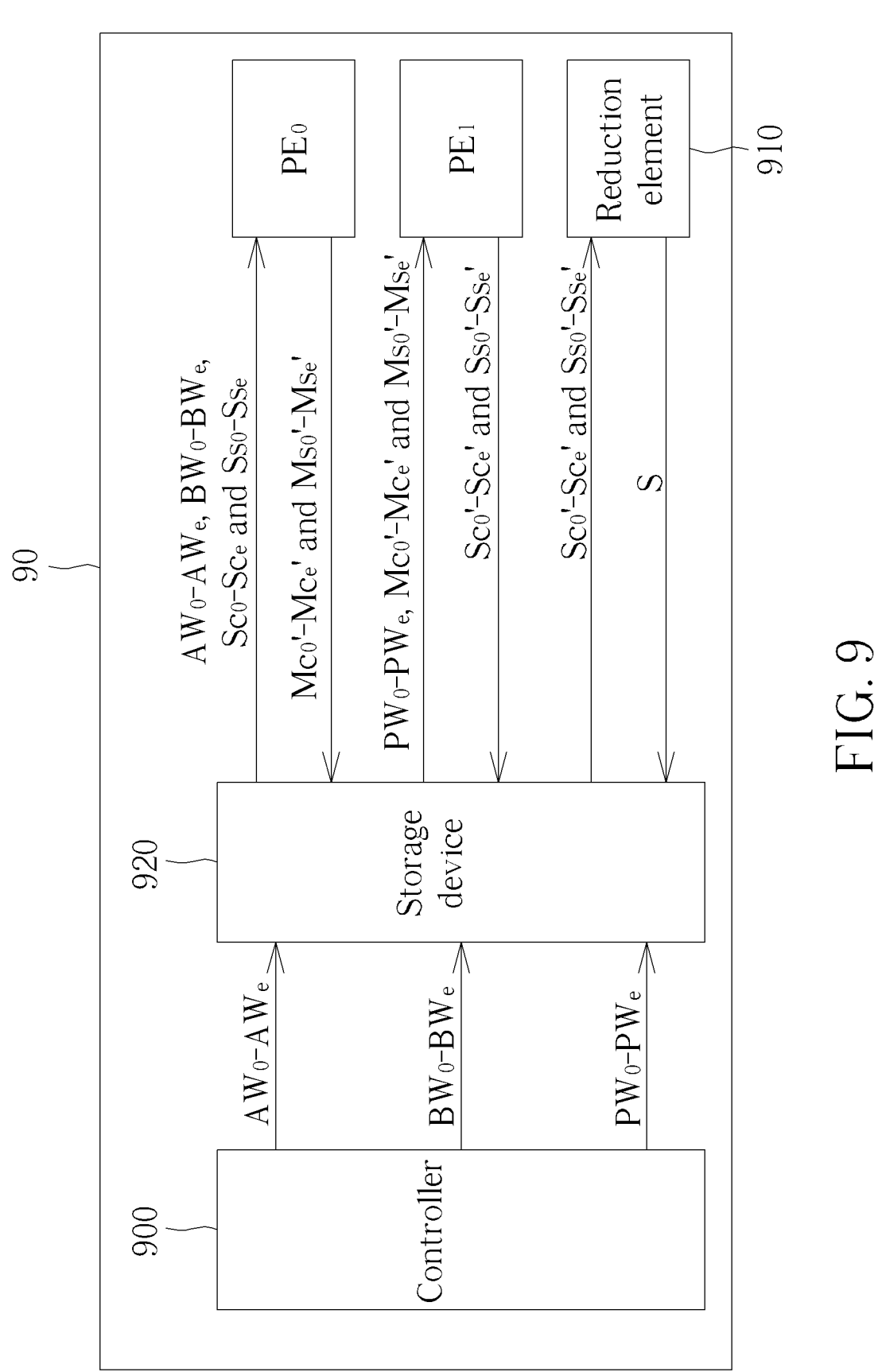
FIG. 9 is a schematic diagram of operations of a modular operation device according to an example of the present invention.

FIG. 9 is a schematic diagram of operations of a modular operation device 90 according to an example of the present invention. In FIG. 9, the modular operation device 90 comprises two processing elements $PE_0$-$PE_1$, a controller 900, a reduction element 910 and at least one storage device 920. The controller 900 is coupled to the processing elements $PE_0$-$PE_1$, the reduction element 910 and the at least one storage device 920.

In detail, the modular operation device 90 is (used) for computing a modular multiplication (i.e., remainder) of a multiplicand A and a multiplier B with respect to a modulus P based on a Montgomery multiplication algorithm. The controller 900 is configured to divide the multiplicand A into (e+1) multiplicand words $AW_0$-$AW_e$, the multiplier B into (e+1) multiplier words $BW_0$-$BW_e$, and the modulus P into (e+1) modulus words $PW_0$-$PW_e$, wherein e≥1. The processing element $PE_0$ is configured to compute the extra quotient $q_i$, (e+1) updated carry results $Mc_0'$-$Mc_e'$ and (e+1) updated sum results $Ms_0'$-$Ms_e'$ according to one multiplier word of the multiplier words $BW_0$-$BW_e$, the multiplicand words $AW_0$-$AW_e$, (e+1) carry results $Sc_0$-$Sc_e$ and (e+1) sum results $Ss_0$-$Ss_e$ (e.g., respectively). The processing element $PE_1$ is configured to compute (e+1) updated carry results $Sc_0'$-$Sc_e'$ and (e+1) updated sum results $Ss_0'$-$Ss_e'$ according to the extra quotient $q_i$, the modulus words $PW_0$-$PW_e$, the updated carry results $Mc_0'$-$Mc_e'$ and the updated sum results $Ms_0'$-$Ms_e'$ (e.g., respectively). Then, the reduction element 910 is configured to compute a resulting remainder S according to the updated carry results $Sc_0'$-$Sc_e'$ and the updated sum results $Ss_0'$-$Ss_e'$. That is, a two-step method is used for computing carry results and sum results. Thus, the problem regarding computing of iterative carry results and sum results is solved.

In one example, the processing elements $PE_0$-$PE_1$ are the same.

Detailed operations and variations of the process 90 can be referred to the above illustration, and are not narrated herein.

Figure 10:
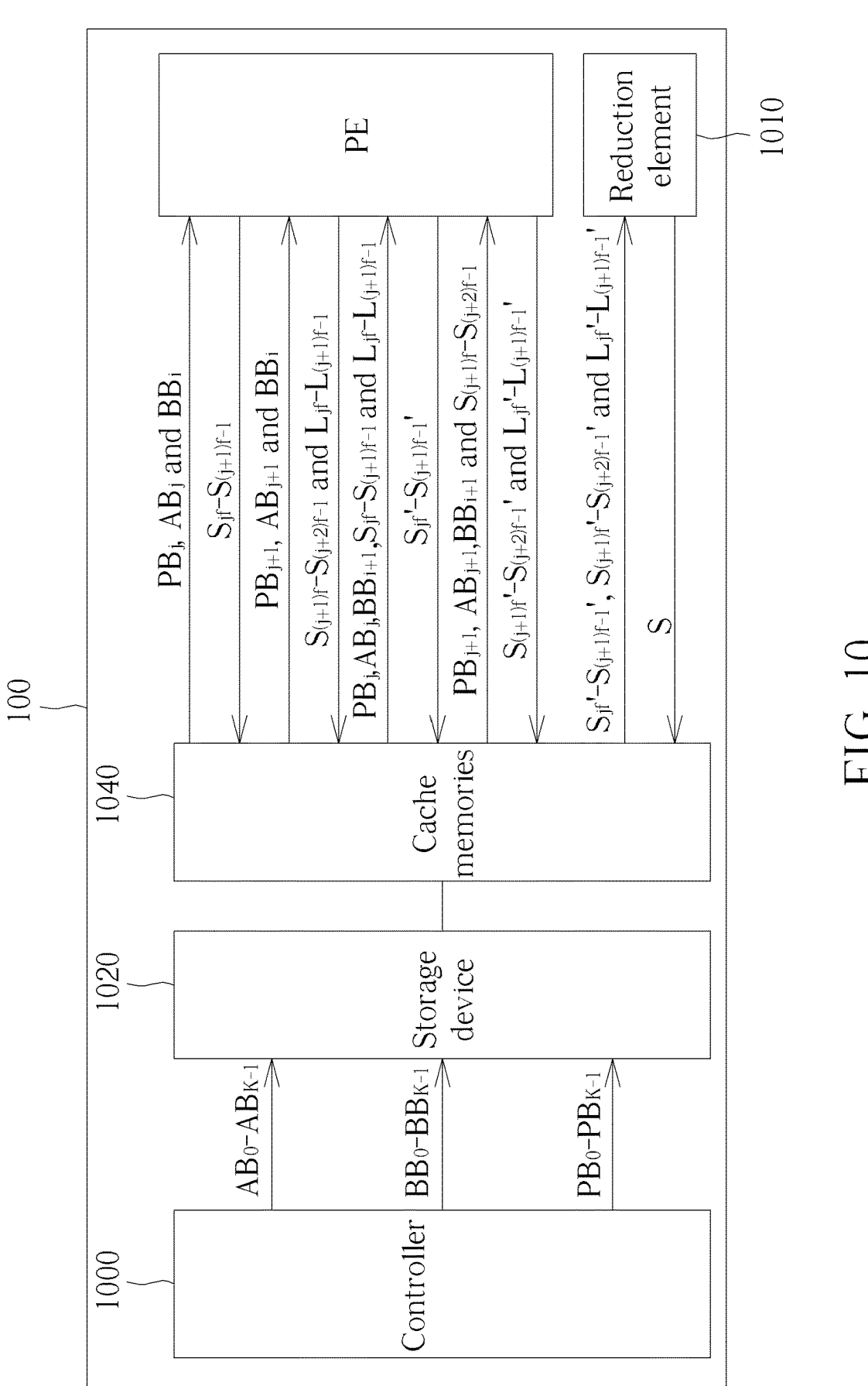
FIG. 10 is a schematic diagram of operations of a modular operation device according to an example of the present invention.

FIG. 10 is a schematic diagram of operations of a modular operation device 100 according to an example of the present invention. In FIG. 10, the modular operation device 100 comprises a processing element PE, a controller 1000, a reduction element 1010, at least one storage device (e.g., main memory) 1020 and a plurality of cache memories 1040. The controller 1000 is coupled to the processing element PE, the reduction element 1010, the at least one storage device 1020 and the plurality of cache memories 1040.

In detail, the modular operation device 100 is (used) for computing a modular multiplication (i.e., remainder) of a multiplicand A and a multiplier B with respect to a modulus P based on a Montgomery multiplication algorithm. The controller 1000 is configured to divide the multiplicand A into K multiplicand blocks $AB_0$-$AB_{K-1}$, the multiplier B into K multiplier blocks $BB_0$-$BB_{K-1}$, and the modulus P into K modulus blocks $PB_0$-$PB_{K-1}$, wherein K≥2. The processing element PE is configured to execute instructions. The instructions comprise computing f sum results $S_{jf}$-$S_{(j+1)f-1}$ according to a multiplicand block $AB_j$ of the multiplicand blocks $AB_0$-$AB_{K-1}$, a modulus block $PB_j$ of the modulus blocks $PB_0$-$PB_{K-1}$ and a multiplier block $BB_i$ of the multiplier blocks $BB_0$-$BB_{K-1}$, wherein f≥2. The instructions comprise computing f sum results $S_{(j+1)f}$-$S_{(j+2)f-1}$ and f delayed sum results $L_{jf}$-$L_{(j+1)f-1}$ according to a multiplicand block $AB_{j+1}$ of the multiplicand blocks $AB_0$-$AB_{K-1}$, a modulus block $PB_{j+1}$ of the modulus blocks $PB_0$-$PB_{K-1}$ and the multiplier block $BB_i$. The instructions comprise computing f updated sum results $S_{jf}'$-$S_{(j+1)f-1}'$ according to the sum results $S_{jf}$-$S_{(j+1)f-1}$, the delayed sum results $L_{jf}$-$L_{(j+1)f-1}$, the multiplicand block $AB_j$, the modulus block $PB_j$ and a multiplier block $BB_{i+1}$ of the multiplier blocks $BB_0$-$BB_{K-1}$. The instructions comprise computing f updated sum results $S_{(j+1)f}'$-$S_{(j+2)f-1}'$ and f updated delayed sum results $L_{jf}'$-$L_{(j+1)f-1}'$ according to the sum results $S_{(j+1)f}$-$S_{(j+2)f-1}$, the multiplicand block $AB_{j+1}$, the modulus block $PB_{j+1}$ and the multiplier block $BB_{i+1}$. Then, the reduction element 1010 is configured to compute a resulting remainder S according to the updated sum results $S_{jf}'$-$S_{(j+1)f-1}'$, the updated sum results $S_{(j+1)f}'$-$S_{(j+2)f-1}'$ and the updated delayed sum results $L_{jf}'$-$L_{(j+1)f-1}'$. That is, a post processing method is used for computing carry results and sum results. Thus, the problem regarding computing of iterative carry results and sum results is solved.

In one example, the processing element PE computes the delayed sum results $L_{jf}$-$L_{(j+1)f-1}$ according to the multiplicand block $AB_{j+1}$, the modulus block $PB_{j+1}$, the multiplier block $BB_i$ and f extra quotients $q_{if}$-$q_{(i+1)f-1}$.

In one example, the multiplicand A is an n-bit integer. In one example, each of the multiplicand blocks $AB_0$-$AB_{K-1}$ is a b-bit integer, and comprises f multiplicand words. In one example, each of the multiplicand words is a w-bit integer, i.e., $K=\lceil n/b \rceil$ and $f=\lceil b/w \rceil$. Note that block numbers and bit lengths of the multiplicand blocks $AB_0$-$AB_{K-1}$, the multiplier words $BB_0$-$BB_{K-1}$ and the modulus words $PB_0$-$PB_{K-1}$ may be changed according to system requirements, and are not limited herein.

In one example, there is a (one-to-one) correspondence between the sum results $S_{jf}$-$S_{(j+1)f-1}$, the updated sum results $S_{jf}'$-$S_{(j+1)f-1}'$ and f multiplicand words $AW_{jf}$-$AW_{(j+1)f-1}$ of the multiplicand block $AB_j$. In one example, there is a (one-to-one) correspondence between the sum results $S_{(j+1)f}$-$S_{(j+2)f-1}$, the updated sum results $S_{(j+1)f}'$-$S_{(j+2)f-1}'$ and f multiplicand words $AW_{(j+1)f}$-$AW_{(j+2)f-1}$ of the multiplicand block $AB_{j+1}$.

In one example, there is a correspondence between the delayed sum results $L_{jf}$-$L_{(j+1)f-1}$ and the sum results $S_{jf}$-$S_{(j+1)f-1}$. In one example, a number of the delayed sum results $L_{jf}$-$L_{(j+1)f-1}$ and a number of the sum results $S_{jf}$-$S_{(j+1)f-1}$ are the same. In one example, the number of the delayed sum results $L_{jf}$-$L_{(j+1)f-1}$ is smaller than the number of the sum results $S_{jf}$-$S_{(j+1)f-1}$. In one example, there is a correspondence between the delayed sum results $L_{jf}$-$L_{(j+1)f-1}$ and f multiplier words $BW_{if}$-$BW_{(i+1)f-1}$ of the multiplier block $BB_i$. In one example, there is a correspondence between the updated delayed sum results $L_{jf}'$-$L_{(j+1)f-1}'$ and f multiplier words $BW_{(i+1)f}$-$BW_{(i+2)f-1}$ of the multiplier block $BB_{i+1}$.

In one example, the modular operation device 100 further comprises a loading and storing element coupled to the controller 1000. The loading and storing element is configured to execute instructions. The instructions comprise loading (e.g., copying) the multiplicand block $AB_j$ and the modulus block $PB_j$ from the at least one storage device 1020 to the plurality of cache memories 1040 (i.e., the multiplicand block $AB_j$ and the modulus block $PB_j$ are loaded from the storage device, and is stored in the cache memories), before the processing element computes the sum results $S_{jf}$-$S_{(j+1)f-1}$. The instructions comprise loading the multiplicand block $AB_{j+1}$ and the modulus block $PB_{j+1}$ from the at least one storage device 1020 to the plurality of cache memories 1040, before the processing element computes the sum results $S_{(j+1)f}$-$S_{(j+2)f-1}$ and the delayed sum results $L_{jf}$-$L_{(j+1)f-1}$. The instructions comprise loading the sum results $S_{jf}$-$S_{(j+1)f-1}$, the delayed sum results $L_{jf}$-$L_{(j+1)f-1}$ and the multiplicand block $AB_j$ and the modulus block $PB_j$ from the at least one storage device 1020 to the plurality of cache memories 1040, before the processing element computes the updated sum results $S_{jf}'$-$S_{(j+1)f-1}'$. The instructions comprise loading the sum results $S_{(j+1)f}$-$S_{(j+2)f-1}$, the multiplicand block $AB_{j+1}$ and the modulus block $PB_{j+1}$ from the at least one storage device 1020 to the plurality of cache memories 1040, before the processing element computes the updated sum results $S_{(j+1)}'$-$S_{(j+2)f-1}'$ and the updated delayed sum results $L_{jf}'$-$L_{(j+1)f-1}'$. In one example, the processing element computes the sum results $S_{jf}$-$S_{(j+1)f-1}$, after accessing (e.g., reading) the multiplicand block $AB_j$ (e.g., loaded) in the plurality of cache memories 1040. The processing element computes sum results $S_{(j+1)f}$-$S_{(j+2)f-1}$ and the delayed sum results $L_{jf}$-$L_{(j+1)f-1}$, after accessing the multiplicand block $AB_{j+1}$ in the plurality of cache memories 1040. The processing element computes the updated sum results $S_{jf}'$-$S_{(j+1)f-1}'$, after accessing the sum results $S_{jf}$-$S_{(j+1)f-1}$, the delayed sum results $L_{jf}$-$L_{(j+1)f-1}$ and the multiplicand block $AB_j$ in the plurality of cache memories 1040. The processing element computes the updated sum results $S_{(j+1)f}'$-$S_{(j+2)f-1}'$, after accessing the sum results $S_{(j+1)f}$-$S_{(j+2)f-1}$ and the multiplicand block $AB_{j+1}$ in the plurality of cache memories 1040. That is, data (e.g., multiplicand words of the multiplicand block) for computations in each block are loaded to the cache memories only for one time. In other words, occurrences of cache misses are reduced.

In one example, the processing element is configured to execute instructions. The instructions comprise storing (e.g., writing) the sum results $S_{jf}$-$S_{(j+1)f-1}$ in the plurality of cache memories 1040, after computing the sum results $S_{jf}$-$S_{(j+1)f-1}$. The instructions comprise storing the sum results $S_{(j+1)f}$-$S_{(j+2)f-1}$ and the delayed sum results $L_{jf}$-$L_{(j+1)f-1}$ in the plurality of cache memories 1040, after computing the sum results $S_{(j+1)f}$-$S_{(j+2)f-1}$ and the delayed sum results $L_{jf}$-$L_{(j+1)f-1}$. The instructions comprise storing the updated sum results $S_{jf}'$-$S_{(j+1)f-1}'$ in the plurality of cache memories 1040, after computing the updated sum results $S_{jf}'$-$S_{(j+1)f-1}'$. The instructions comprise storing the updated sum results $S_{(j+1)f}'$-$S_{(j+2)f-1}'$ in the plurality of cache memories 1040, after computing the updated sum results $S_{(j+1)f}'$-$S_{(j+2)f-1}'$. In one example, the loading and storing element is configured to execute instructions. The instructions comprise storing the sum results $S_{jf}$-$S_{(j+1)f-1}$ in the at least one storage device 1020, after the processing element computes the sum results $S_{jf}$-$S_{(j+1)f-1}$. The instructions comprise storing the sum results $S_{(j+1)f}$-$S_{(j+2)f-1}$ and the delayed sum results $L_{jf}$-$L_{(j+1)f-1}$ in the at least one storage device 1020, after the processing element computes the sum results $S_{(j+1)f}$-$S_{(j+2)f-1}$ and the delayed sum results $L_{jf}$-$L_{(j+1)f-1}$. The instructions comprise storing the updated sum results $S_{jf}'$-$S_{(j+1)f-1}'$ in the at least one storage device 1020, after the processing element computes the updated sum results $S_{jf}'$-$S_{(j+1)f-1}'$. The instructions comprise storing the updated sum results $S_{(j+1)f}'$-$S_{(j+2)f-1}'$ in the at least one storage device 1020, after the processing element computes the updated sum results $S_{(j+1)f}'$-$S_{(j+2)f-1}'$.

In one example, the loading and storing element is further configured to execute instructions. The instructions comprise loading the multiplicand block $AB_j$ and the modulus block $PB_j$ to a first cache memory of the plurality of cache memories 1040. The instructions comprise loading the multiplicand block $AB_{j+1}$ and the modulus block $PB_{j+1}$ to a second cache memory of the plurality of cache memories 1040, when the processing element computes the sum results $S_{jf}$-$S_{(j+1)f-1}$. The instructions comprise loading the sum results $S_{jf}$-$S_{(j+1)f-1}$, the delayed sum results $L_{jf}$-$L_{(j+1)f-1}$, the multiplicand block $AB_j$ and the modulus block $PB_j$ to the first cache memory, when the processing element computes the sum results $S_{(j+1)f}$-$S_{(j+2)f-1}$ and the delayed sum results $L_{jf}$-$L_{(j+1)f-1}$. The instructions comprise loading the sum results $S_{(j+1)f}$-$S_{(j+2)f-1}$, the multiplicand block $AB_{j+1}$ and the modulus block $PB_{j+1}$ to the second cache memory, when the processing element computes the updated sum results $S_{jf}'$-$S_{(j+1)f-1}'$.

Figure 11:
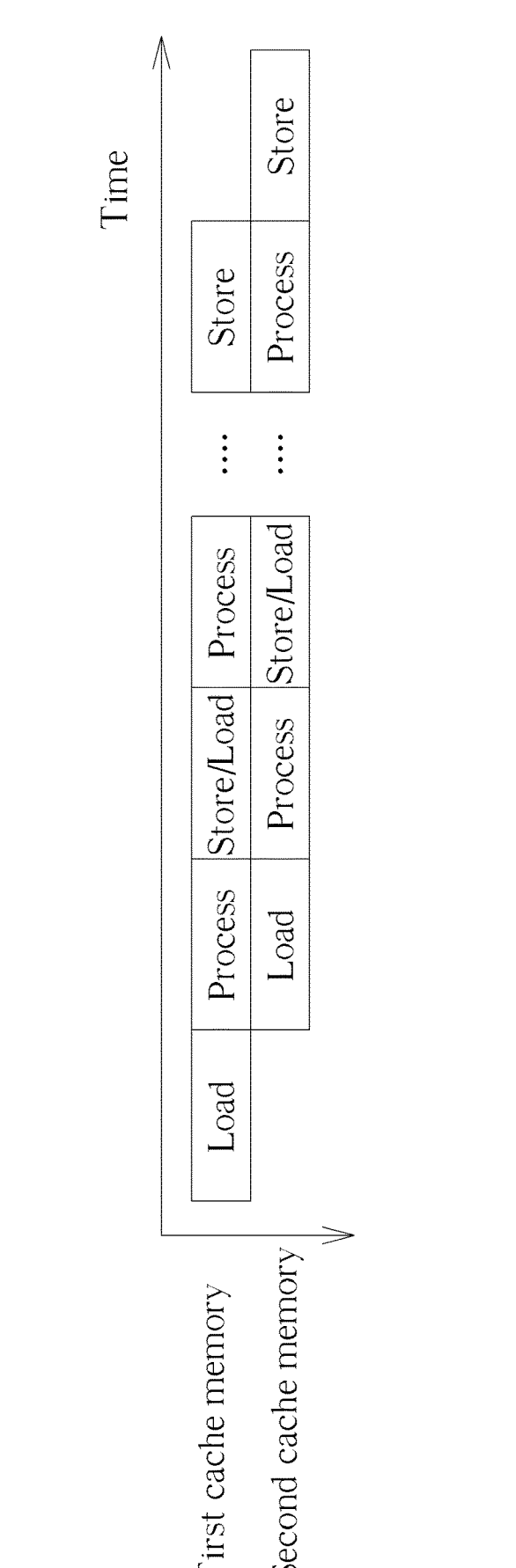
FIG. 11 is a schedule table of operations of a modular multiplication according to an example of the present invention.

FIG. 11 is a schedule table 110 of operations of a modular multiplication according to an example of the present invention. In detail, the loading and storing element loads the multiplicand block $AB_j$, the modulus block $PB_j$ to the first cache memory, before the processing element computes sum results $S_{jf}$-$S_{(j+1)f-1}$. The loading and storing element loads the multiplicand block $AB_{j+1}$, the modulus block $PB_{j+1}$ to the second cache memory, when the processing element computes the sum results $S_{jf}$-$S_{(j+1)f-1}$. The loading and storing element stores the sum results $S_{jf}$-$S_{(j+1)f-1}$ (e.g., stored) in the first cache memory in the at least one storage device 1020, when the processing element computes the sum results $S_{(j+1)f}$-$S_{(j+2)f-1}$ and the delayed sum results $L_{jf}$-$L_{(j+1)f-1}$. The loading and storing element loads the multiplicand block $AB_j$ and the modulus block $PB_j$ to the first cache memory, before the processing element computes sum results $S_{jf}'$-$S_{(j+1)f-1}'$. The loading and storing element loads the multiplicand block $AB_{j+1}$ and $PB_{j+1}$ to the second cache memory, when the processing element computes the sum results $S_{jf}'$-$S_{(j+1)f-1}'$. The loading and storing element stores the sum results $S_{(j+1)f}$-$S_{(j+2)f-1}$ and the delayed sum results $L_{jf}$-$L_{(j+1)f-1}$ in the second cache memory in the at least one storage device 1020, when the processing element computes the updated sum results $S_{jf}'$-$S_{(j+1)f-1}'$ The loading and storing element stores the updated sum results $S_{jf}'$-$S_{(j+1)f-1}'$ in the first cache memory in the at least one storage device 1020, when the processing element computes the updated sum results $S_{(j+1)f}'$-$S_{(j+2)f-1}'$. The loading and storing element stores the updated sum results $S_{(j+1)f}'$-$S_{(j+2)f-1}'$ in the second cache memory in the at least one storage device 1020. That is, a Ping-Pong cache memory (e.g., Ping-Pong buffer) is used for computing sum results in the modular multiplication.

In one example, the processing element is further configured to execute instructions. The instructions comprise computing f delayed carry results $H_{if}$-$H_{(i+1)f-1}$ according to a most significant word $AW_{(j+1)f-1}$ of the multiplicand block $AB_j$ and the multiplier block $BB_i$. The instructions comprise computing f delayed carry results $H_{(i+1)f}$-$H_{(i+2)f-1}$ according to the most significant word $AW_{(j+1)f-1}$ and the multiplier block $BB_{i+1}$. In one example, the reduction element is further configured to execute instructions of: computing the resulting remainder S according to the updated sum results $Ms_0$'-$Ms_e$', the updated sum results $Ss_0$'-$Ss_e$', the updated delayed sum results $L_{jf}$'-$L_{(j+1)f-1}$', the delayed carry results $H_{jf}$'-$H_{(j+1)f-1}$ and the delayed carry results $H_{(i+1)f}$-$H_{(i+2)f-1}$. In one example, the processing element computes the delayed sum results $L_{jf}$-$L_{jf+f-1}$ according to a least significant word $AW_{(j+1)f}$ of the multiplicand block $AB_{j+1}$ and the multiplier block $BB_i$, and computes the updated delayed sum results $L_{jf}$'-$L_{jf+f-1}$' according to the least significant word $AW_{(j+1)f}$ and the multiplier block $BB_{i+1}$. In one example, the processing element computes the delayed sum results $L_{jf}$-$L_{(j+1)f-1}$ (e.g., only) according to the least significant word $AW_{(j+1)f}$, the multiplier block $BB_i$, $PB_{(j+1)f}$, f extra quotients $q_{jf}$-$q_{(i+1)f-1}$ and a first plurality of temporary carry results. The processing element computes the updated delayed sum results $L_{jf}$'-$L_{jf+f-1}$' (e.g., only) according to the least significant word $AW_{(j+1)f}$, the multiplier block $BB_{i+1}$ and a second plurality of temporary carry results, wherein the first plurality of temporary carry results and the second plurality of temporary carry results are computed according to a second least significant word $AW_{(j+1)f+1}$ of the multiplicand block $AB_{j+1}$. For example, the processing element does not compute the delayed sum results $L_{jf}$-$L_{(j+1)f-1}$ according to the delayed carry results $H_{jf}$-$H_{(j+1)f-1}$ computed according to the most significant word $AW_{(j+1)f-1}$ of the multiplicand block $AB_j$. The processing element does not compute the updated delayed sum results $L_{jf}$'-$L_{jf+f-1}$' according to the delayed carry results $H_{(i+1)f}$-$H_{(i+2)f-1}$ computed according to the most significant word $AW_{(j+1)f-1}$.

In one example, the processing element is further configured to execute instructions. The instructions comprise computing a delayed carry result $H_{(i+1)f-1}$ according to a most significant word $AW_{(j+1)f-1}$ of the multiplicand block $AB_j$ and a most significant word $BW_{(j+1)f-1}$ of the multiplier block $BB_i$, determining the delayed carry result $H_{(i+1)f-1}$ as a most significant result $S_{(j+1)f-1}$ of the sum results $S_{jf}$-$S_{(j+1)f-1}$. The instructions comprise computing a delayed carry result $H'_{(i+1)f-1}$ according to a most significant word $AW_{(j+2)f-1}$ of the multiplicand block $AB_{j+1}$ and the most significant word $BW_{(i+1)f-1}$, and determining the delayed carry result $H'_{(i+1)f-1}$ as a most significant result $S_{(j+2)f-1}$ of the sum results $S_{(j+1)f}$-$S_{(j+2)f-1}$.

In one example, the instruction of computing the updated sum results $S_{jf}$'-$S_{(j+1)f-1}$' comprises computing a plurality of temporary sum results according to the sum results $S_{jf}$-$S_{(j+1)f-1}$, the delayed sum results $L_{jf}$-$L_{(j+1)f-1}$, the multiplicand block $AB_j$ and a first word of the multiplicand block $BB_{i+1}$, and computing the updated sum results $S_{jf}$'-$S_{(j+1)f-1}$' according to the plurality of temporary sum results, the multiplicand block $AB_j$ and a second word of the multiplier block $BB_{i+1}$. In one example, the first word of the multiplier block $BB_{i+1}$ is a least significant word $BW_{(i+1)f}$ of the multiplier block $BB_{i+1}$ (i.e., preprocess of iterative sum results and iterative delayed sum results).

In one example, the processing element is further configured to execute an instruction of: computing an extra quotient $q_{jf+u}$ according to a least significant result $S_0$ of the sum results $S_0$-$S_{f-1}$, a least significant result $L_0$ of the delayed sum results $L_0$-$L_{f-1}$ and an inverse word in an iteration corresponding to a word $BB_{jf+u}$ of the multiplier block $BB_i$, wherein the inverse word is a remainder of an inverse of a least significant word $PW_0$ of a least significant modulus block $PB_0$ of the modulus blocks $PB_0$-$PB_{K-1}$ divided by a radix $2^w$.

In one example, there is a correspondence between the extra quotient block $qB_i$ and a multiplier block $BB_i$ of the multiplier blocks $BB_0$-$BB_{K-1}$, wherein the least significant result $S_{jf}$ is computed according to the multiplier block $BB_i$. In one example, the processing element computes the extra quotient block $qB_i$ one time in an iteration corresponding to the multiplier block $BB_i$.

According to the above description, an example of a pseudo code can be obtained as follows:

Initialize S to 0.

Initialize carry out results L, L_n, Ca and Cb to 0.

```
    for (i = 0: k − 1) begin
Perform a block_0 process. // Process a least significant block.
    for (j = 1:k − 1) begin
Perform at least one block_1 process. // Process other blocks.
    end
Determine L_n as L_(k−1)f.
Determine Ca[k − 1] as L_n .
Determine Cb[k − 2:0] as Ca[k − 2:0] .
    end
    // Post process of S + L.
Determine 0 as Cc and Ca[−1].
    for (i = 0: k − 1) begin
Compute Cc and S_j according to S_j + L_j + Ca[i − 1] + Cc .
    for (j = 0: f − 1) begin
Compute Cc and S_j according to S_j + L_j + Cc.
    end
    end
Determine Cc + L_n as S_jk.
Ca[k − 1] is a (k − 1)-th bit of Ca, and Cb[k − 2:0] is a segment with a most
significant bit (k − 2) and a least significant bit 0.
```

In one example, the processing element is further configured to execute instructions. The instructions comprise computing a delayed carry result $H_{(i+1)f-1}$ according to a most significant word $AW_{(j+1)f-1}$ of the multiplicand block $AB_j$ and a most significant word $BW_{(j+1)f-1}$ of the multiplier block $BB_i$, determining the delayed carry result $H_{(i+1)f-1}$ as a most significant result $S_{(j+1)f-1}$ of the sum results $S_{jf}$-$S_{(j+1)f-1}$. The instructions comprise computing a delayed carry result $H'_{(i+1)f-1}$ according to a most significant word $AW_{(j+2)f-1}$ of the multiplicand block $AB_{j+1}$ and the most significant word $BW_{(i+1)f-1}$, and determining the delayed In addition, the block_0 process can be obtained as follows:

Initialize Cb[0] to 0.

```
    for (v = 0:f − 1) begin
Compute Cb[0] and S_v according to S_v + L_v + Cb[0].
    end
    for (u = 0:f − 1) begin
    // X task
Determine AW_0 × BW_{jf+u} + S_0 as T.
Determine T[w − 1:0] as S_0.
```

-continued

```
Determine T[2w – 1:w] as Mc.
Determine S₀ × t as q_{if+u}.
Determine PW₀ × C_{if+u} + S₀ as T'.
Determine T'[2w – 1:w] as Sc.
   for (v = 1:f – 1) begin // Y task
Determine AW_v × BW_{if+u} + S_v + Mc as T.
Determine T[w – 1:0] as S_v.
Determine T[2w – 1:w] as Mc.
Determine PW_v × C_v + S_v + SC as T'.
Determine T'[w – 1:0] as S_{v−1}.
Determine T'[2w – 1:w] as Sc.
   end
Compute Cb[0] and S_{f−1} according to Cb[0] + Mc + Sc.
   end
```

In addition, the block_1 process can be obtained as follows:

Initialize Cb[j] to Ca[j−1].

```
   for (v = 0: f – 1) begin
Compute Cb[j] and S_{jf+v} according to S_{jf+v} + L_{jf+v} + Cb[j].
   end
   for (u = 0: f – 1) begin
   // X task
Determine AW_{jf} × BW_{if+u} + S_{jf} as T.
Determine T[w – 1:0] as S_{jf}.
Determine T[2w – 1:w] as Mc.
Determine PW_{jf} × q_{if+u} + S_{jf} as T'
Determine T'[w – 1:0] as L_{(j−1)f+u}.
Determine T'[2w – 1:w] as Sc.
   for (v = 1:f – 1) begin // Y task
Determine AW_{jf+v} × BW_{if+u} + S_{jf+v} + Mc as T.
Determine T[w – 1:0] as S_{jf+v}.
Determine T[2w – 1:w] as Mc.
Determine PW_{jf+v} × q_{if+u} + S_{jf+v} + SC as T'.
Determine T'[w – 1:0] as S_{jf+v−1}.
Determine T'[2w – 1:w] as Sc.
   end
Compute Cb[j] and S_{jf+f−1} according to Cb[j] + Mc + Sc.
   end
```

Figure 12:
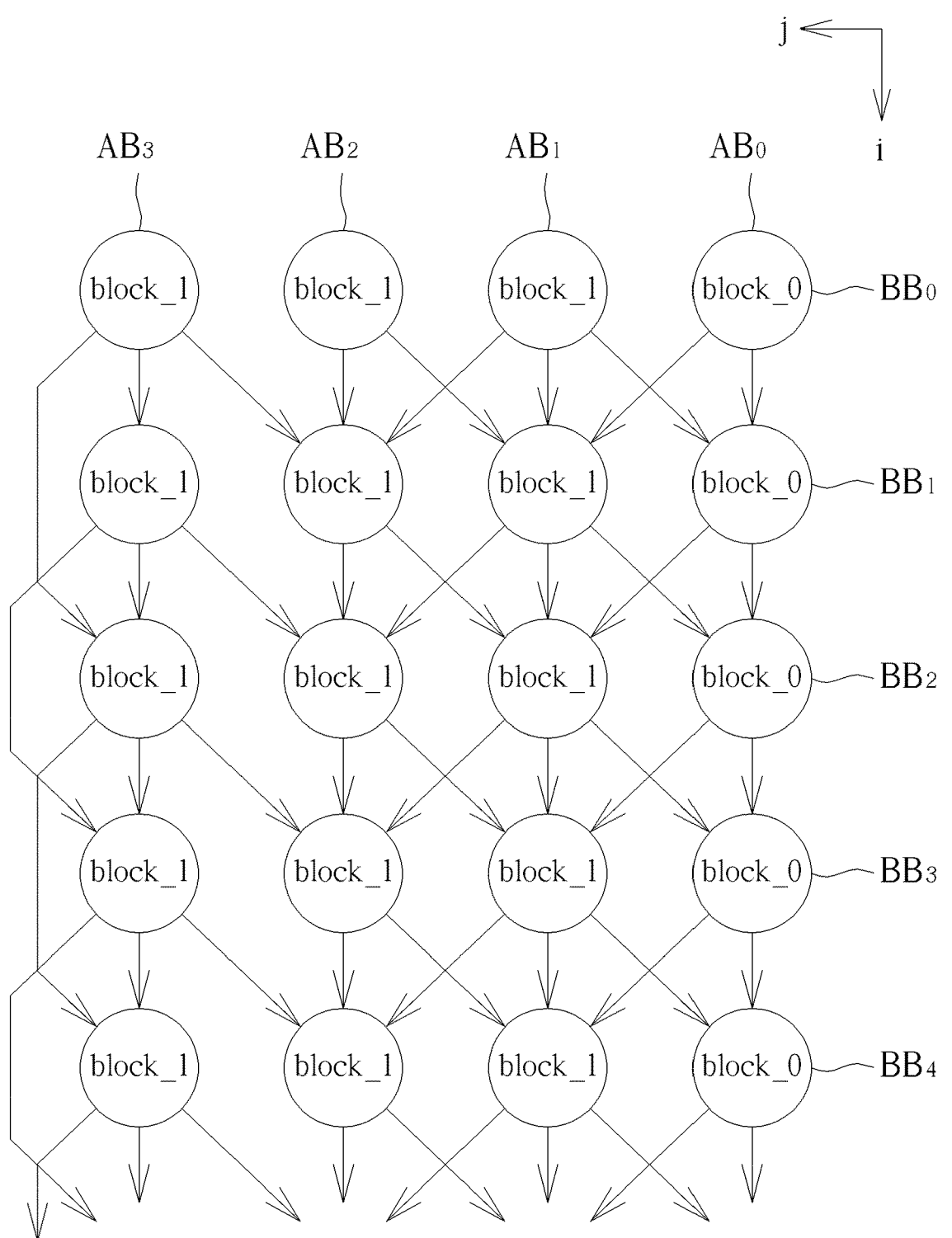
FIG. 12 is a schematic diagram of data dependency of carry results and sum results according to an example of the present invention.

According to the above description, data dependency of carry results and sum results according to an example of the present invention are shown in FIG. 12. Note that a number of multiplicand blocks $AW_0$-$AW_3$ and a number of multiplier blocks $BW_0$-$BW_4$ are not limited herein.

Figure 13:
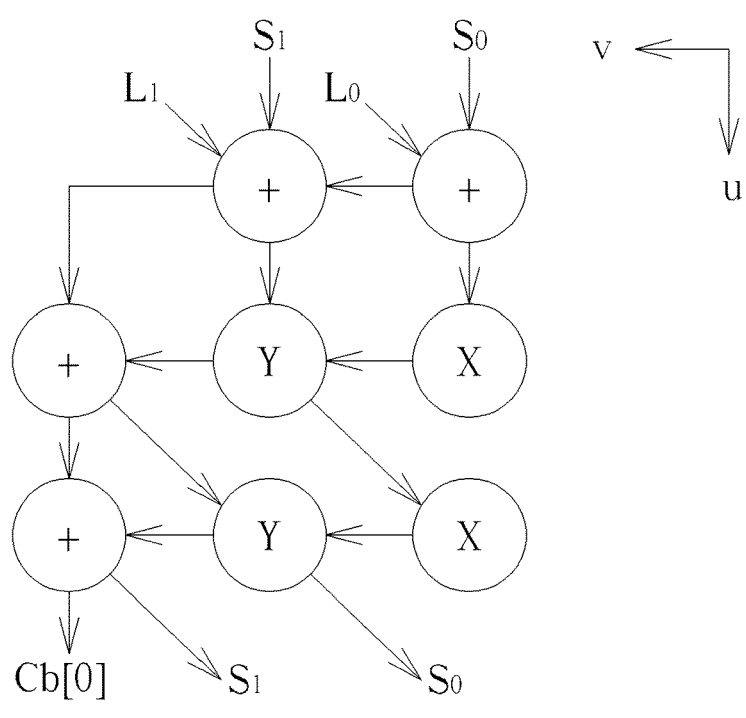
FIG. 13 is a schematic diagram of data dependency of carry results and sum results according to an example of the present invention.
Figure 14:
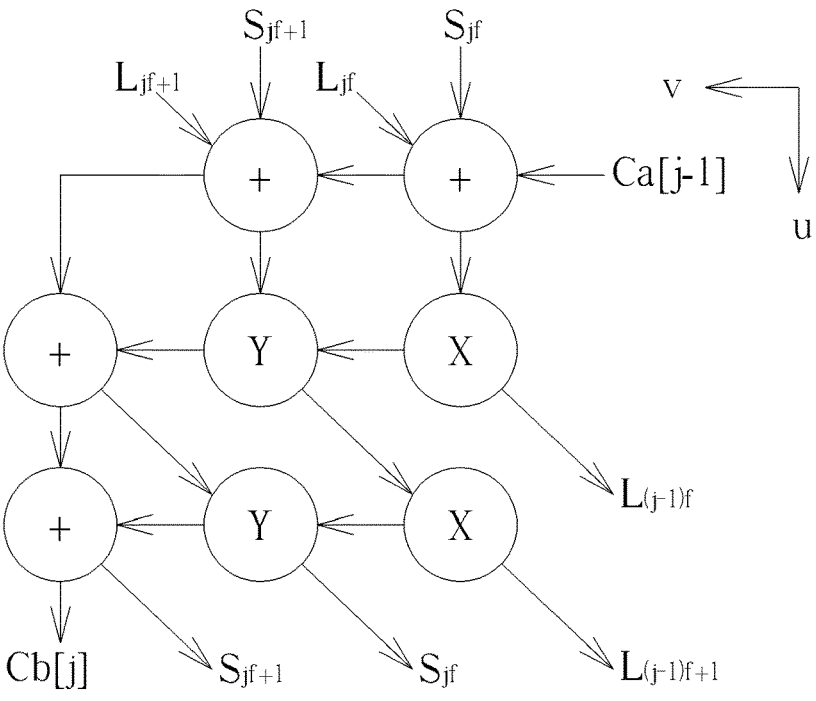
FIG. 14 is a schematic diagram of data dependency of carry results and sum results according to an example of the present invention.

In detail, data dependency of carry results and sum results in a block_0 process are shown in FIG. 13. In addition, data dependency of carry results and sum results in a block_1 process are shown in FIG. 14.

Figure 15:
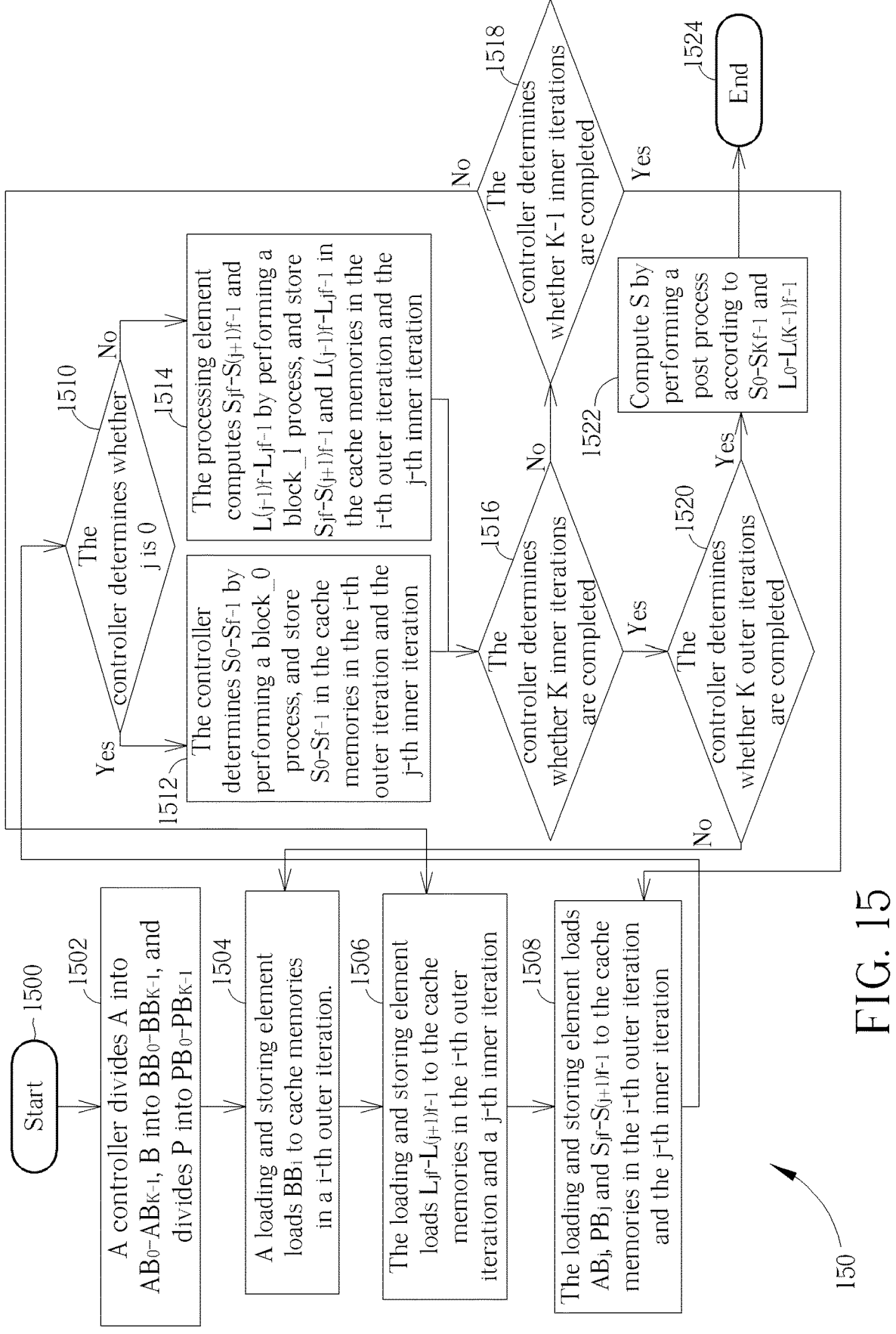
FIG. 15 is a flowchart of a process according to an example of the present invention.

Operations of the modular operation device in the above examples can be summarized into a process 150 shown in FIG. 15, and can be compiled into the program codes 114. The process 150 includes the following steps:

Step 1500: Start.

Step 1502: A controller divides A into $AB_0$-$AB_{K−1}$, B into $BB_0$-$BB_{K−1}$, and divides P into $PB_0$-$PB_{K−1}$.

Step 1504: A loading and storing element loads $BB_i$ to cache memories in a i-th outer iteration.

Step 1506: The loading and storing element loads $L_{jf}$-$L_{(j+1)f−1}$ to the cache memories in the i-th outer iteration and a j-th inner iteration.

Step 1508: The loading and storing element loads $AB_j$, $PB_j$ and $S_{jf}$-$S_{(j+1)f−1}$ to the cache memories in the i-th outer iteration and the j-th inner iteration.

Step 1510: The controller determines whether j is 0. If yes, perform Step 1512, otherwise, perform Step 1514.

Step 1512: A processing element computes $S_0$-$S_{f−1}$ by performing a block_0 process, and stores $S_0$-$S_{f−1}$ in the cache memories in the i-th outer iteration and the j-th inner iteration. Perform Step 1516.

Step 1514: The processing element computes $S_{jf}$-$S_{(j+)f−1}$ and $L_{(j−1)f}$-$L_{jf−1}$ by performing a block_1 process, and stores $S_{jf}$-$S_{(j+)f−1}$ and $L_{(j−1)f}$-$L_{jf−1}$ in the cache memories in the i-th outer iteration and the j-th inner iteration.

Step 1516: The controller determines whether K inner iterations are completed. If yes, perform Step 1520, otherwise, perform Step 1518.

Step 1518: The controller determines whether (K−1) inner iterations are completed. If yes, perform Step 1508, otherwise, perform Step 1506.

Step 1520: The controller determines whether K outer iterations are completed. If yes, perform Step 1522, otherwise, perform Step 1504.

Step 1522: A reduction element computes S by performing a post process according to $S_0$-$S_{Kf−1}$ and $L_0$-$L_{(K−1)f−1}$.

Step 1524: End.

Figure 16:
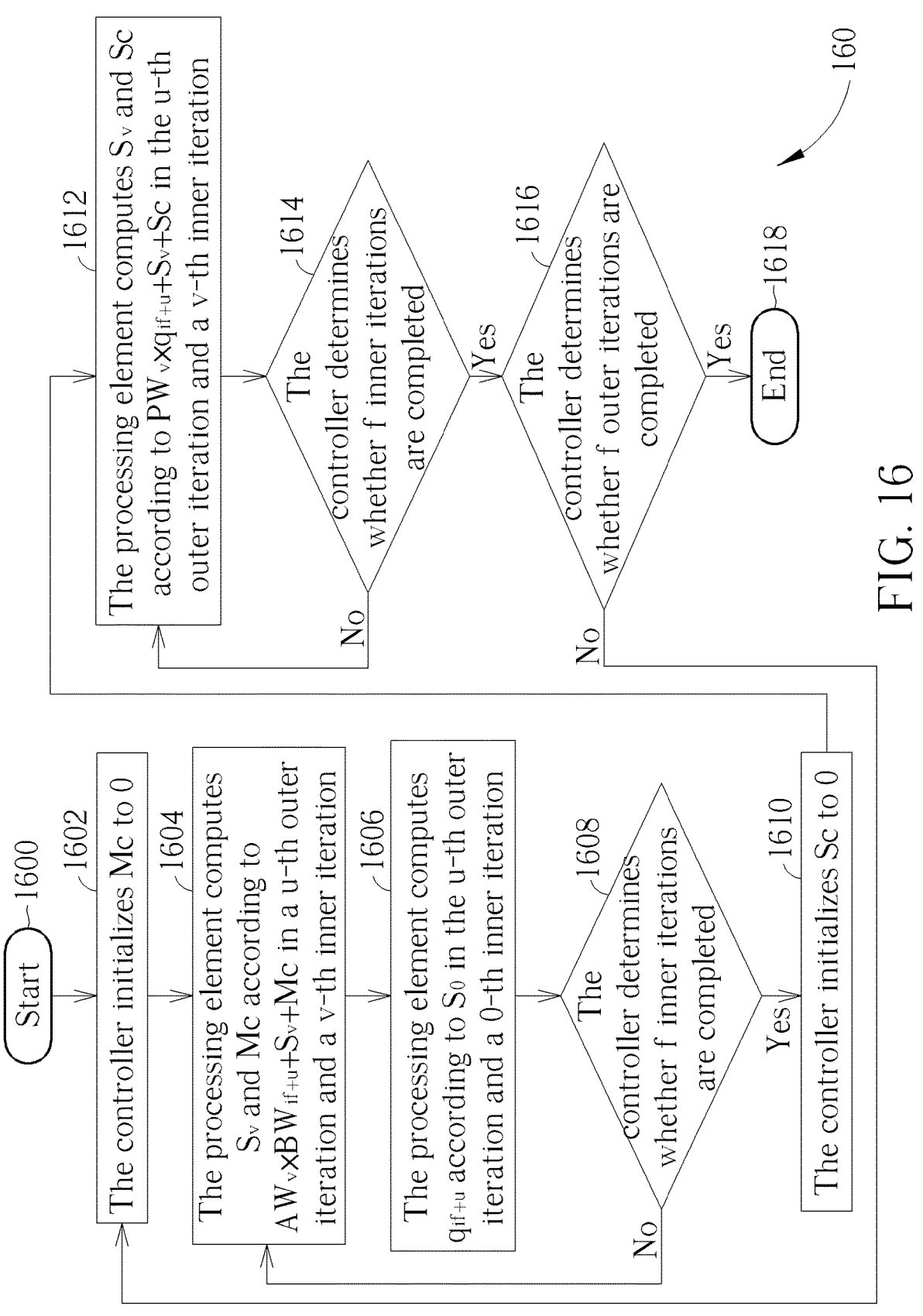
FIG. 16 is a flowchart of a process according to an example of the present invention.

The block_0 process of Step 1512 in FIG. 15 may be realized by a process 160 shown in FIG. 16. The process 160 includes the following steps:

Step 1600: Start.

Step 1602: The controller initializes Mc to 0.

Step 1604: The processing element computes $S_v$ and Mc according to $AW_v×BW_{if+u}+S_v+Mc$ in a u-th outer iteration and a v-th inner iteration.

Step 1606: The processing element computes $q_{if+u}$ according to $S_0$ in the u-th outer iteration and a 0-th inner iteration.

Step 1608: The controller determines whether f inner iterations are completed. If yes, perform Step 1610, otherwise, perform Step 1604.

Step 1610: The controller initializes Sc to 0.

Step 1612: The processing element computes $S_v$ and Sc according to $PW_v×q_{if+u}+S_v+Sc$ in the u-th outer iteration and a v-th inner iteration.

Step 1614: The controller determines whether f inner iterations are completed. If yes, perform Step 1616, otherwise, perform Step 1612.

Step 1616: The controller determines whether f outer iterations are completed. If yes, perform Step 1618, otherwise, perform Step 1602.

Step 1618: End.

Figure 17:
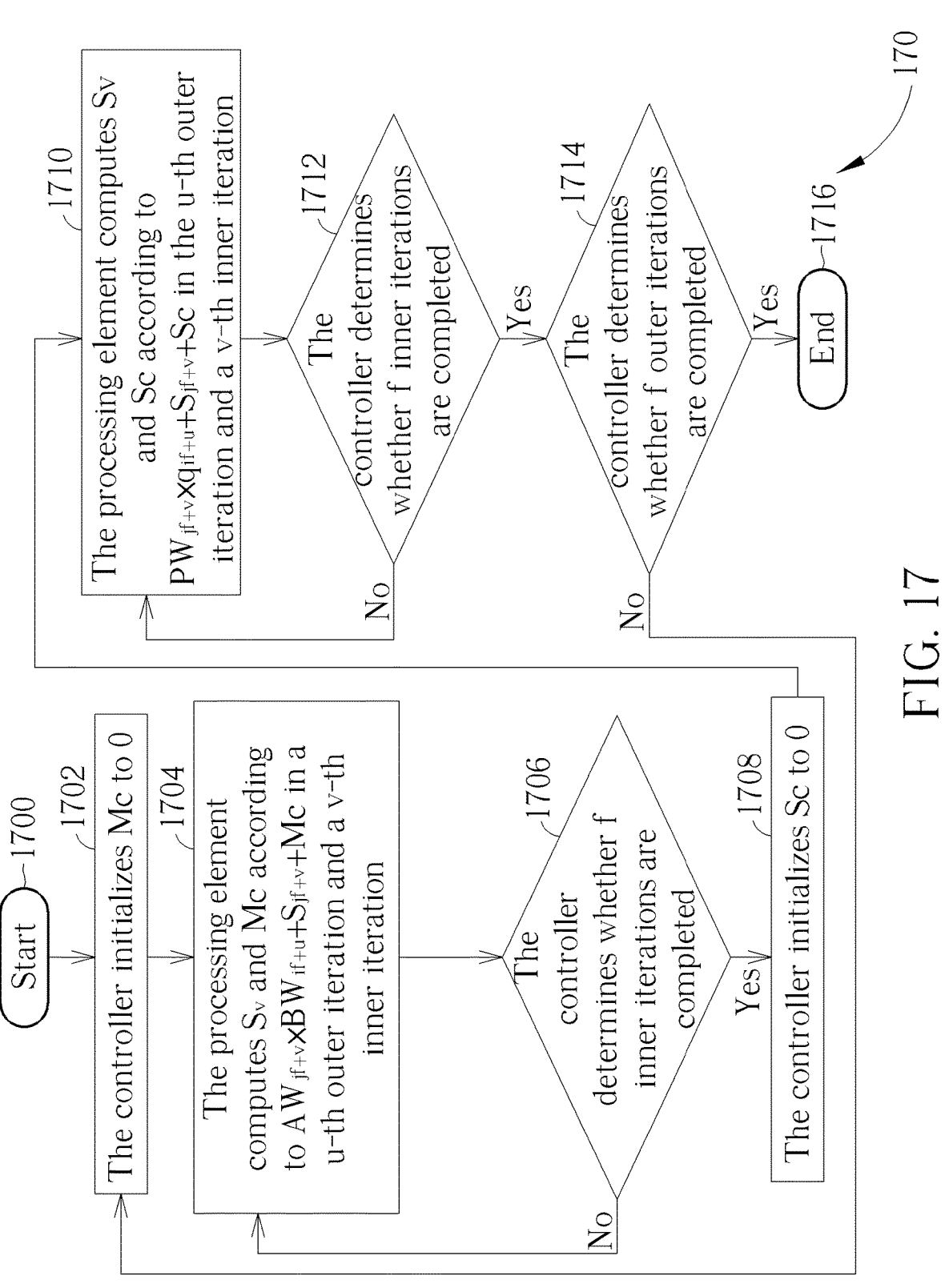
FIG. 17 is a flowchart of a process according to an example of the present invention.

The block_1 process of Step 1514 in FIG. 15 may be realized by a process 170 shown in FIG. 17. The process 170 includes the following steps:

Step 1700: Start.

Step 1702: The controller initializes Mc to 0.

Step 1704: The processing element computes $S_v$ and Mc according to $AW_{jf+v}×BW_{if+u}+S_{jf+v}+Mc$ in a u-th outer iteration and a v-th inner iteration.

Step 1706: The controller determines whether f inner iterations are completed. If yes, perform Step 1708, otherwise, perform Step 1704.

Step 1708: The controller initializes Sc to 0.

Step 1710: The processing element computes $S_v$ and Sc according to $PW_{jf+v}×q_{if+u}+S_{jf+v}+Sc$ in the u-th outer iteration and a v-th inner iteration.

Step 1712: The controller determines whether f inner iterations are completed. If yes, perform Step 1714, otherwise, perform Step 1710.

Step 1714: The controller determines whether f outer iterations are completed. If yes, perform Step 1716, otherwise, perform Step 1702.

Step 1716: End.

Detailed operations and variations of the processes 1500, 1600 and 1700 can be referred to the above illustration, and are not narrated herein.

Figure 18:
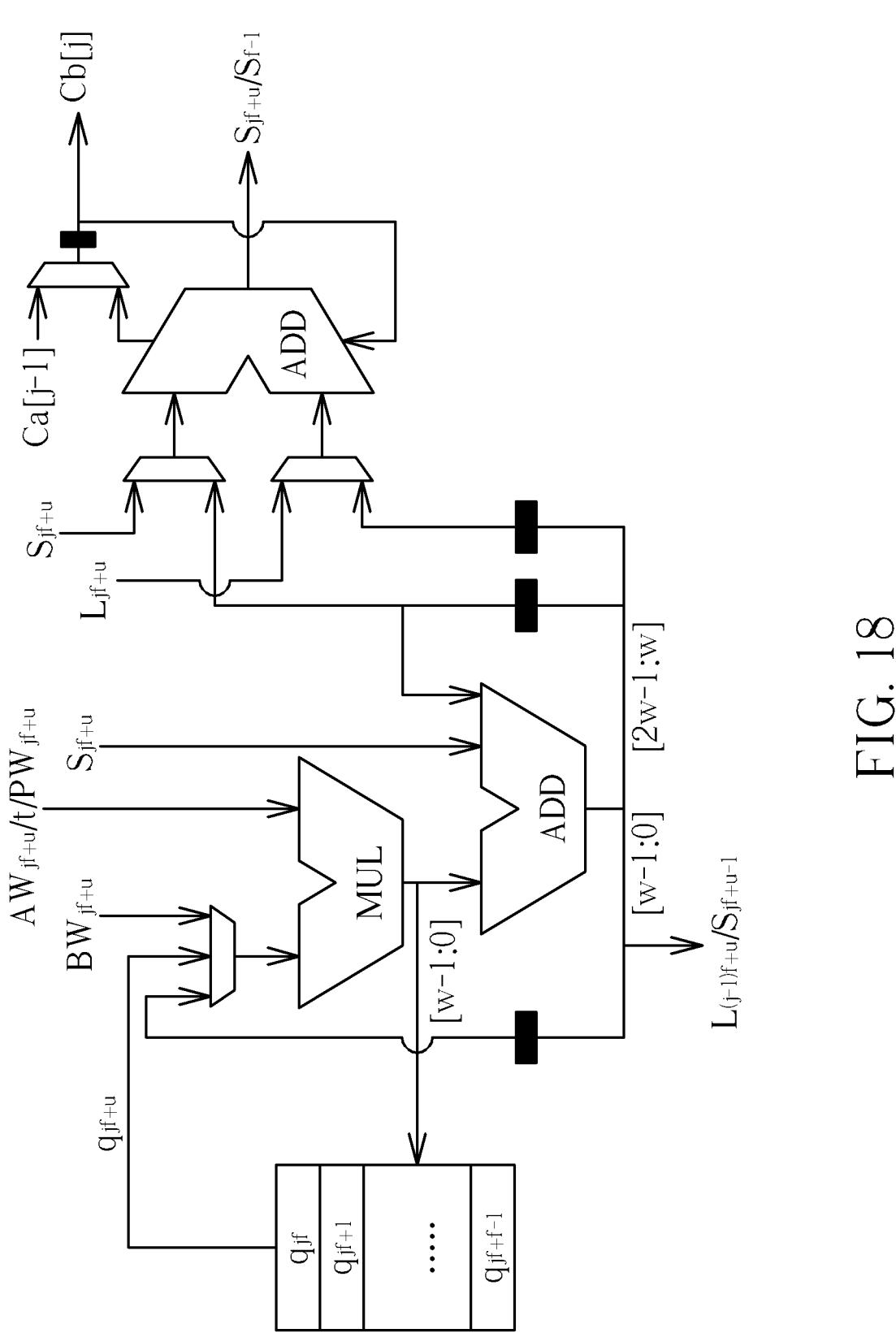
FIG. 18 is a schematic diagram of data flows of a processing element according to an example of the present invention.

According to the above description, data flows of a processing element are shown in FIG. 18. In FIG. 18, $t=-PW_0^{-1} \bmod 2^w$.

Note that the modular multiplication provided in the present invention may be regarded as an improved and efficient Montgomery modulation multiplication.

The operation of "determine" described above may be replaced by the operation of "compute", "calculate", "obtain", "generate", "output", "use", "choose/select" or "decide". The term of "according to" described above may be replaced by "in response to". The phrase of "associated with" described above may be replaced by "of" or "corresponding to". The term of "into" described above may be replaced by "to" or "in". The term of "via" described above may be replaced by "on", "in" or "at". The term "at least one of . . . or . . . " described above may be replaced by "at least one of . . . or at least one of . . . " or "at least one selected from the group of . . . and . . . ".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the modular operation device 10.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage device) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the modular operation device 10.

To sum up, the present invention provides a device and method of handling a modular multiplication. Operations performed by the modular operation device are defined. A two-step method is used for computing carry results and sum results. As a result, the problem regarding computing of iterative carry results and sum results is solved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A modular operation device for handling a Montgomery multiplication in a public-key cryptographic algorithm, comprising:

a storage device configured to store a plurality of multiplicand words $AW_0$-$AW_e$, a plurality of multiplier words $BW_0$-$BW_e$, a plurality of modulus words $PW_0$-$PW_e$, a first plurality of carry results $Sc_0$-$Sc_e$, and a first plurality of sum results $Ss_0$-$Ss_e$, wherein $e \geq 1$;

a controller, coupled to the storage device, configured to:

divide a multiplicand A into the plurality of multiplicand words $AW_0$-$AW_e$, a multiplier B into the plurality of multiplier words $BW_0$-$BW_e$, and a modulus P into the plurality of modulus words $PW_0$-$PW_e$; and initialize the first plurality of carry results $Sc_0$-$Sc_e$ and the first plurality of sum results $Ss_0$-$Ss_e$ to 0;

a first plurality of K processing elements $PE_0$-$PE_{K-1}$, coupled to the controller and the storage device, configured to compute a first plurality of updated carry results and a first plurality of updated sum results, wherein $K \geq 2$, and each processing element $PE_j$ is configured to, in an i-th outer iteration and a u-th inner iteration where $0 \leq u < \lceil (e+1)/K \blacktriangle$:

perform a first read operation to read $AW_{uK+j}$, $BW_i$, $Sc_{uK+j}$, and $Ss_{uK+i+1}$ from the storage device;

perform a first process operation to compute an updated carry result $Mc_{uK+j}$ and an updated sum result $Ms_{uK+j}$ in parallel according to $AW_{uK+j} \times BW_i + Sc_{uK+j} + Ss_{uK+j+1}$; and perform a first write operation to store $Mc_{uK+j}$ and $Ms_{uK+j}$ in the storage device, wherein a (u+1)-th first read operation, a u-th first process operation, and a (u−1)-th first write operation are performed in parallel;

wherein one of the first plurality of K processing elements is further configured to compute an extra quotient $q_i$ according to a least significant result $Ms_0$ of the first plurality of updated sum results and an inverse word in the i-th outer iteration and a u-th inner iteration, wherein the inverse word is a remainder of an inverse of a least significant word $PW_0$ of the plurality of modulus words divided by a radix;

a second plurality of K processing elements, coupled to the controller and the storage device, configured to compute a second plurality of updated carry results and a second plurality of updated sum results, wherein each of the second plurality of K processing elements is configured to, in the i-th outer iteration and a v-th inner iteration where $0 \leq v < \lceil (e+1)/K \rceil$:

perform a second read operation to read $PW_{vK+j}$, and $Ms_{vK+j}$ from the storage device;

perform a second process operation to compute an updated carry result $Sc_{vK+j}$ and an updated sum result $Ss_{vK+j}$ in parallel according to $PW_{vK+j} \times q_i + Mc_{vK+j-1} + Ms_{vK+j}$; and perform a second write operation to store $Sc_{vK+j}$ and $Ss_{vK+j}$ in the storage device, wherein a (v+1)-th second read operation, a v-th second process operation, and a (v−1)-th second write operation are performed in parallel;

wherein the controller is further configured to:

determine whether $\lceil (e+1)/K \blacktriangle$ inner iterations are completed for the first plurality of K processing elements, and if not, continue performing the first read, process, and write operations;

determine whether $\lceil (e+1)/K \rceil$ inner iterations are completed for the second plurality of K processing elements, and if not, continue performing the second read, process, and write operations; and determine whether (e+1) outer iterations are completed, and if not, continue performing the operations of the first and second plurality of K processing elements; and a reduction element, coupled to the controller and the storage device, configured to compute a resulting remainder S according to the second plurality of updated carry results $Sc_0$-$Sc_e$ and the second plurality of updated sum results $Ss_0$-$Ss_e$ after completion of the (e+1) outer iterations;

wherein the controller, the first plurality of K processing elements $PE_0$-$PE_{K-1}$, the second plurality of K processing elements, and the reduction element are implemented as part of an application specific integrated circuit;

wherein in the public-key cryptographic algorithm, the modular operation device receives the modulus P, a key, and a cryptographic data as inputs for a cryptographic operation, and the modular operation device performs the Montgomery multiplication using the modulus P, the key, and the cryptographic data, and generating the resulting remainder as a cryptographic output of the cryptographic operation.

2. The modular operation device of claim 1, wherein the first plurality of K processing elements compute the first plurality of updated carry results and the first plurality of updated sum results according to the plurality of multiplicand words, the plurality of multiplier words, the first plurality of carry results and a plurality of shifted sum results of the first plurality of sum results.

3. The modular operation device of claim 2, wherein each of the first plurality of updated carry results and each of the first plurality of updated sum results are computed according to the following instructions:

multiplying a multiplicand word of the plurality of multiplicand words with the multiplier word, to obtain a multiplication;

adding a carry result of the first plurality of carry results and the shifted sum result of the plurality of shifted sum results to the multiplication, to obtain a number;

dividing the number by a radix, to obtain a quotient and a remainder;

determining the quotient as an updated carry result of the first plurality of updated carry results; and determining the remainder as an updated sum result of the first plurality of updated sum results.

4. The modular operation device of claim 1, wherein the second plurality of K processing elements compute the second plurality of updated carry results and the second plurality of updated sum results according to the plurality of modulus words, a plurality of shifted updated carry results of the first plurality of updated carry results and the first plurality of updated sum results.

5. The modular operation device of claim 4, wherein each of the second plurality of updated carry results and each of the second plurality of updated sum results are computed according to the following instructions:

multiplying a modulus word of the plurality of modulus words with the extra quotient, to obtain a multiplication;

adding a shifted updated carry result of the plurality of shifted updated carry results and a sum result of the first plurality of updated sum results to the multiplication, to obtain a number;

dividing the number by a radix, to obtain a quotient and a remainder;

determining the quotient as an updated carry result of the second plurality of updated carry results; and determining the remainder as an updated sum result of the second plurality of updated sum results.

6. The modular operation device of claim 1, wherein:

the second plurality of K processing elements compute the first plurality of carry results and the first plurality of sum results in a first iteration corresponding to a first word of the plurality of multiplier words;

the first plurality of K processing elements compute the first plurality of updated carry results and the first plurality of updated sum results in a second iteration corresponding to a second word of the plurality of multiplier words; and the second plurality of K processing elements compute the second plurality of updated carry results and the second plurality of updated sum results in the second iteration.

* * * * *